(12) United States Patent
Coppersmith et al.

(10) Patent No.: US 11,468,242 B1
(45) Date of Patent: *Oct. 11, 2022

(54) PSYCHOLOGICAL STATE ANALYSIS OF TEAM BEHAVIOR AND COMMUNICATION

(71) Applicant: SONDERMIND INC., Denver, CO (US)

(72) Inventors: Glen A. Coppersmith, Plymouth, MA (US); Patrick N Crutchley, Philadelphia, PA (US); Ophir Frieder, Chevy Chase, MD (US); Ryan Leary, Woodstock, GA (US); Anthony D. Wood, Waltham, MA (US); Aleksander Yelskiy, Norwood, MA (US)

(73) Assignee: SONDERMIND INC., Denver, CO (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/999,303

(22) Filed: Aug. 21, 2020

Related U.S. Application Data

(63) Continuation of application No. 16/007,218, filed on Jun. 13, 2018, now Pat. No. 10,860,805.

(60) Provisional application No. 62/520,486, filed on Jun. 15, 2017, provisional application No. 62/522,637, filed on Jun. 20, 2017.

(51) Int. Cl.
*G06F 40/30* (2020.01)
*G06F 40/40* (2020.01)

(52) U.S. Cl.
CPC .............. *G06F 40/30* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 6,101,470 A * | 8/2000 | Eide | G10L 13/10 704/260 |
| 7,222,075 B2 | 5/2007 | Petrushin | |
| 8,700,012 B2 * | 4/2014 | Ferren | H04L 63/083 715/708 |
| 10,025,775 B2 | 7/2018 | Nowson et al. | |
| 10,127,928 B2 * | 11/2018 | Gainsboro | H04M 3/568 |
| 10,437,332 B1 * | 10/2019 | Paterson | G06F 40/166 |
| 10,510,000 B1 * | 12/2019 | Commons | G06F 16/3344 |
| 10,860,805 B1 | 12/2020 | Coppersmith et al. | |
| 2011/0119048 A1 | 5/2011 | Shaw | |
| 2012/0324493 A1 | 12/2012 | Holmdahl et al. | |
| 2013/0019187 A1 | 1/2013 | Hind et al. | |
| 2013/0138428 A1 | 5/2013 | Chandramouli et al. | |
| 2014/0114655 A1 * | 4/2014 | Kalinli-Akbacak | G10L 25/63 704/231 |
| 2014/0253672 A1 | 9/2014 | Bank et al. | |
| 2015/0256634 A1 | 9/2015 | Bastide et al. | |

(Continued)

*Primary Examiner* — Neeraj Sharma

(57) ABSTRACT

A computer evaluates free-form text messages among members of a team, using natural language processing techniques to process the text messages and to assess psychological state of the team members as reflected it the text messages. The computer assembles the psychological state as reflected in the messages to evaluate team collective psychological state. The computer reports a trend of team collective psychological state in natural language text form.

18 Claims, 17 Drawing Sheets

(56) References Cited

U.S. PATENT DOCUMENTS

| | | |
|---|---|---|
| 2015/0348569 A1* | 12/2015 | Allam .................... G10L 25/27 |
| | | 704/257 |
| 2016/0124908 A1 | 5/2016 | Cecchi et al. |
| 2016/0203831 A1* | 7/2016 | Elyashiv ................ G10L 25/48 |
| | | 704/270 |
| 2017/0019357 A1 | 1/2017 | Lee et al. |
| 2018/0101776 A1* | 4/2018 | Osotio ................ G06F 16/258 |
| 2018/0124243 A1 | 5/2018 | Zimmerman |
| 2018/0331839 A1 | 11/2018 | Gao et al. |
| 2021/0012068 A1 | 1/2021 | Coppersmith et al. |

\* cited by examiner

Signal Counts

| Interval Start Date | Sentiment | | | Emotion | | | | | |
|---|---|---|---|---|---|---|---|---|---|
| | Neutrality | Positive | Negative | No Emotion | Joy | Sadness | Surprise | Anger | Fear |
| 2017-05-24 | 266 | 42 | 3 | 236 | 35 | 13 | 7 | 12 | 8 |
| 2017-05-27 | 12 | 2 | 0 | 9 | 3 | 1 | 0 | 0 | 1 |
| 2017-05-30 | 425 | 38 | 8 | 323 | 66 | 18 | 20 | 27 | 17 |
| 2017-06-02 | 420 | 34 | 8 | 341 | 45 | 24 | 14 | 18 | 20 |
| 2017-06-05 | 1048 | 99 | 25 | 910 | 118 | 33 | 39 | 32 | 40 |
| 2017-06-08 | 766 | 48 | 12 | 621 | 68 | 47 | 29 | 33 | 28 |
| 2017-06-11 | 768 | 55 | 10 | 636 | 105 | 27 | 22 | 21 | 22 |
| 2017-06-14 | 1495 | 136 | 26 | 1200 | 105 | 200 | 45 | 55 | 52 |
| 2017-06-17 | 695 | 74 | 15 | 611 | 92 | 31 | 12 | 17 | 21 |
| 2017-06-20 | 1264 | 131 | 19 | 1037 | 194 | 67 | 47 | 34 | 35 |
| 2017-06-23 | 154 | 10 | 0 | 113 | 13 | 6 | 15 | 7 | 10 |
| 2017-06-26 | 888 | 87 | 17 | 794 | 96 | 38 | 27 | 22 | 15 |
| 2017-06-29 | 600 | 32 | 7 | 442 | 96 | 31 | 31 | 11 | 28 |
| 2017-07-02 | 324 | 26 | 8 | 257 | 73 | 6 | 9 | 6 | 7 |
| 2017-07-05 | 1271 | 158 | 19 | 1092 | 161 | 59 | 44 | 49 | 43 |
| 2017-07-08 | 1513 | 158 | 49 | 1455 | 122 | 57 | 27 | 38 | 21 |
| 2017-07-11 | 2100 | 253 | 187 | 1997 | 266 | 69 | 49 | 82 | 77 |
| 2017-07-14 | 601 | 89 | 52 | 594 | 81 | 9 | 27 | 23 | 8 |
| 2017-07-17 | 1689 | 217 | 74 | 1540 | 225 | 40 | 62 | 76 | 37 |
| 2017-07-20 | 596 | 72 | 41 | 519 | 108 | 24 | 20 | 25 | 13 |
| 2017-07-23 | 990 | 71 | 28 | 840 | 113 | 34 | 32 | 31 | 39 |
| 2017-07-26 | 1366 | 163 | 72 | 1244 | 165 | 45 | 53 | 49 | 45 |
| 2017-07-29 | 784 | 73 | 13 | 591 | 141 | 44 | 44 | 22 | 28 |
| 2017-08-01 | 1364 | 148 | 42 | 1296 | 134 | 28 | 45 | 24 | 27 |
| 2017-08-04 | 135 | 28 | 2 | 119 | 23 | 14 | 3 | 2 | 4 |
| 2017-08-07 | 1008 | 82 | 20 | 868 | 100 | 32 | 32 | 45 | 33 |

FIG. 6(c)

PSYCHOLOGICAL STATE ANALYSIS OF TEAM BEHAVIOR AND COMMUNICATION

This application is a continuation of U.S. patent application Ser. No. 16/007,218, filed Jun. 13, 2018 (Now U.S. Pat. No. 10,860,805), which claims the benefit of U.S. provisional application Ser. Nos. 62/520,486, filed Jun. 15, 2017, and 62/522,637, filed Jun. 20, 2017, both titled "Computerized Analysis of Team Behavior and Communication to Quantify and Optimize Team Function." The parent application and both provisional applications are incorporated by reference.

BACKGROUND

This application relates to computerized analysis of psychological function and resilience of humans and teams.

Many specialized work teams operate in novel, challenging, or adversarial contexts in which individuals and teams face multiple and/or chronic stressors. Team resilience is crucial for an organization where teamwork is critical and the work can be psychologically taxing, especially for teams whose primary function is cognitive. The cost of overstressing a team is highest when this dysfunction affects highly skilled teams with rare or unique abilities—the measurement of this impact is not only in lost dollars, but lost capability. No additional budgets could bring replacement or supplemental capabilities, and in some situations these teams are asked to perform despite chronic overstress on the team, a vicious cycle.

Stress on a team is measured as "collective allostatic load" (CAL), which captures stress properties of the team, relating to performance, resilience or dysfunction in the face of potentially multiple acute and chronic stressors, or the psychological level of wear and stress on the team as a whole. (For an individual. "allostatic load" is "the wear and tear on the body" which accumulates as an individual is exposed to repeated or chronic stress. It represents the physiological consequences of chronic exposure to fluctuating or heightened neural or neuroendocrine response that results from repeated or chronic stress.)

SUMMARY

In general, in a first aspect, the invention features a method. A computer evaluates free-form text messages among members of a team, using natural language processing techniques to assess emotional content, sentiment, and psychological well-being of the team members, and of the team as a whole. A computer evaluates team collective allostatic load (CAL) of the team. A computer reports diagnoses and/or recommendations for team composition or action to the team members and to management.

In general, in a second aspect, the invention features a method, and a computer programmed to compute the method. A computer evaluates free-form text messages among members of a team, using natural language processing techniques to process the text messages and to assess psychological state of the team members as reflected it the text messages. The computer assembles the psychological state as reflected in the messages to evaluate team collective psychological state. The computer reports a trend of team collective psychological state in natural language text form.

Specific embodiments of the invention may include one or more of the following features. Natural language processing techniques may be used to process the text messages and to assess at least three emotions of the team members as reflected in the text messages, the three emotions drawn from the group consisting of anger, disgust, fear, happiness, sadness, love, surprise, trust, distrust, surprise, or anticipation. Computed sentiment may lie on a spectrum from positive to neutral to negative. One or more environmental factors in a work area of the team may be monitored, for factors such as temperature, humidity, sound level, and sound character. A multiplex graph may be computed into the memory of the computer, nodes of the graph corresponding to members of the team, layers of the multiplex graph corresponding to respective psychological attributes, and edges of the graph within each layer representing respective psychological attributes as reflected between the two people corresponding to the nodes of the edge. Psychological state assessment counts may be histogrammed by time interval, or by time interval and psychological assessment value. Trends of the assessed team collective psychological state and assessment counts by time interval may be computed.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 6(c) shows a database table of text messages.

DESCRIPTION

The Description is organized as follows.
I. Overview
   I.A. Modeling allostatic load and emotional state of individuals and collective allostatic load and emotional state of teams
      I.A.1. Individual allostatic load
      I.A.2. Team stress and collective allostatic load
II. Technical implementation
   II.A. Passive monitoring, integrating data from multiple dimensions
   II.B. Emotion and sentiment analysis
   II.C. Processing to locate patterns and provide evaluations
   II.D. Network analysis
      II.D.1. Assembling the multiplex graph
      II.D.2. Analyzing the multiplex graph
      II.D.3. Recommendations
   II.E. Machine learning and training of models
III. Reports and recommendations to reduce collective allostatic load
IV. Use cases
V. Computer implementation
VI. Incorporation by Reference
VII. Conclusion

I. OVERVIEW

Figure 1A:
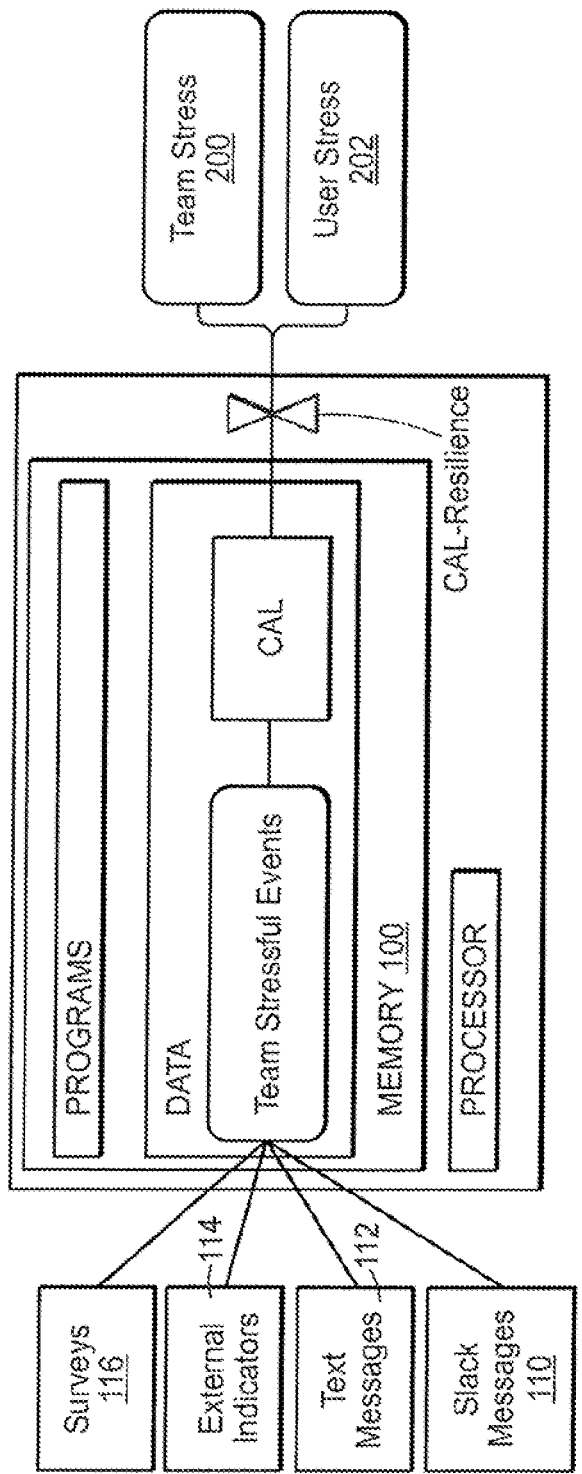
FIGS. 1(a) and 1(b) are block diagrams of a computer system.
Figure 1B:
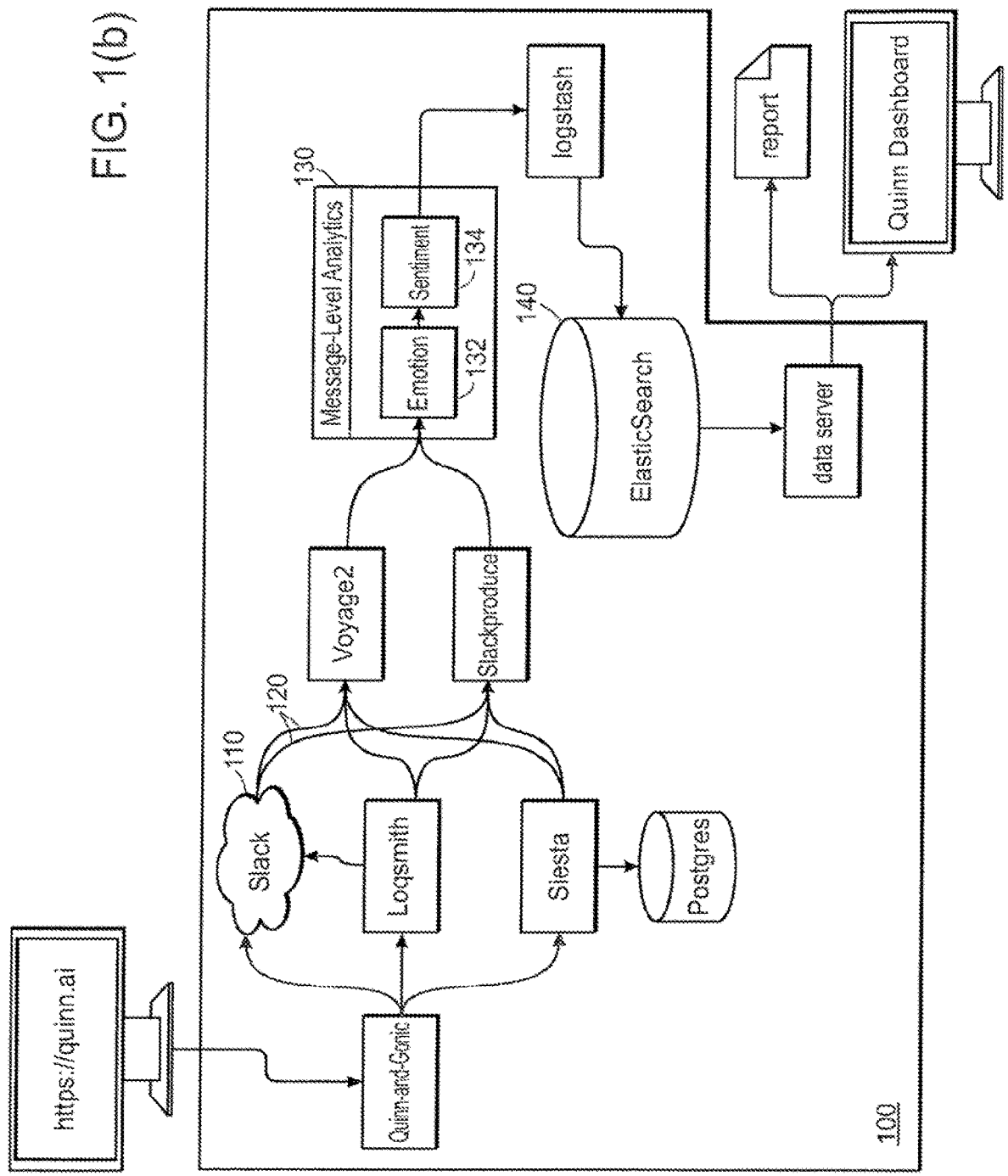
Figure 1C:
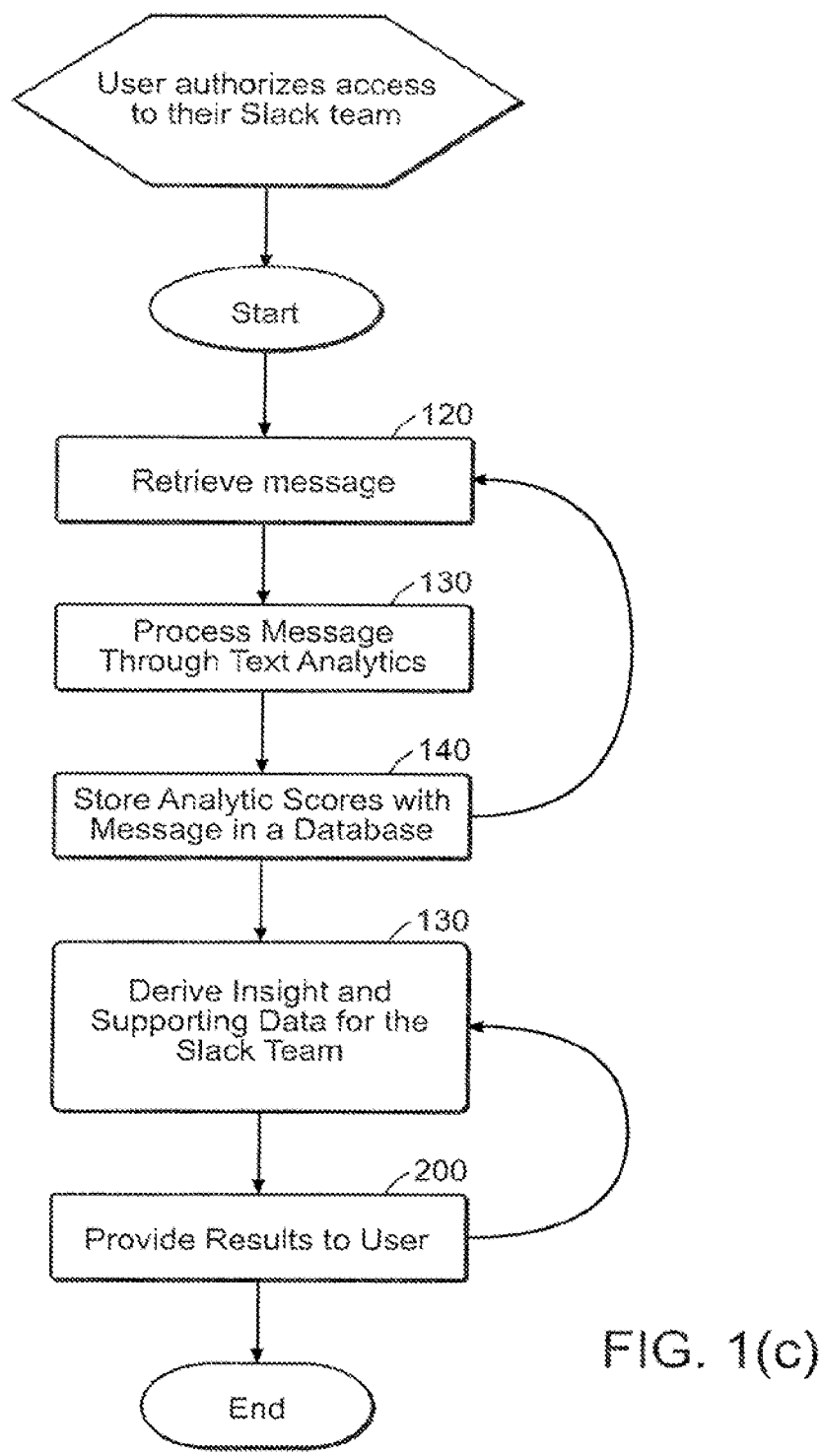
FIGS. 1(c), 6(a) and 6(b) are flow charts.

Referring to FIGS. 1(a), 1(b), and 1(c), computer system 100 may use natural language processing and other artificial intelligence techniques to evaluate Slack messages 110, other free-form text 112, other sensor monitoring 114 of team members and their environment, behavior, and communication of workers or team members of a team, and surveys 116 to assess emotional content, sentiment, and psychological well-being of the team's members and of the team as a whole. The evaluation may assess emotions 132, sentiment (positive, negative, or neutral) 134, dynamics, team resilience, function of members of a work group, and/or individuals' allostatic load or team collective allostatic load (CAL), and offer diagnoses and recommendations to the team members and to management. System 100 may use unobtrusive measurement techniques to observe intra-team communications 110, 112, which may facilitate user adoption and retention, which in turn may lead to a large enough engaged cohort for analysis and engagement in rigorous scientific investigation (e.g., randomized trials) to assess causal relationships related to CAL and other aspects of effective team dynamics.

Additional observable variables may include surveys 116 and similar "active" collection of information on the team. In addition, system 100 may collect "passive" data 110, 112, 114, that is, data that are created and exist independently of system 100. From those data, system 100 may infer team stress 200 and stress on individual team members 202.

The emotional classifiers 132 and sentiment classifiers 134 discerned from text and sensors may include suicide risk, mental illness, joy, fear, sadness, anger, or frustration among team members, team effectiveness, language between two team members (e.g., mentor-mentee, cooperative, consultative, joint problem solving, helpful disagreement, sharp, or condescending), and CAL. These analyses may provide an experimental testbed to evaluate emotional state of individuals and of the team. Leaders may use the evaluation to evaluate leadership techniques, to evaluate intra-group dynamics, etc.

Figure 2A:
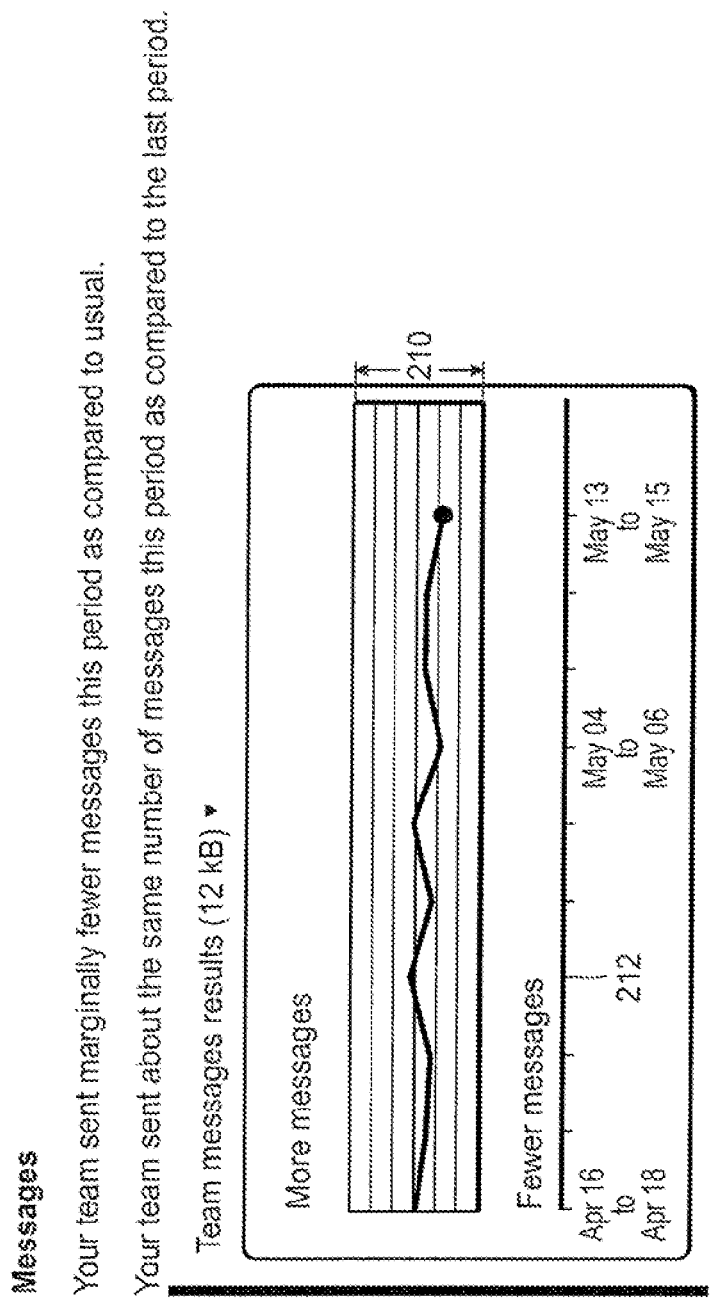
FIGS. 2(a)-2(g), and 3(c) are screen shots of displays generated on a computer display.
Figure 2B:
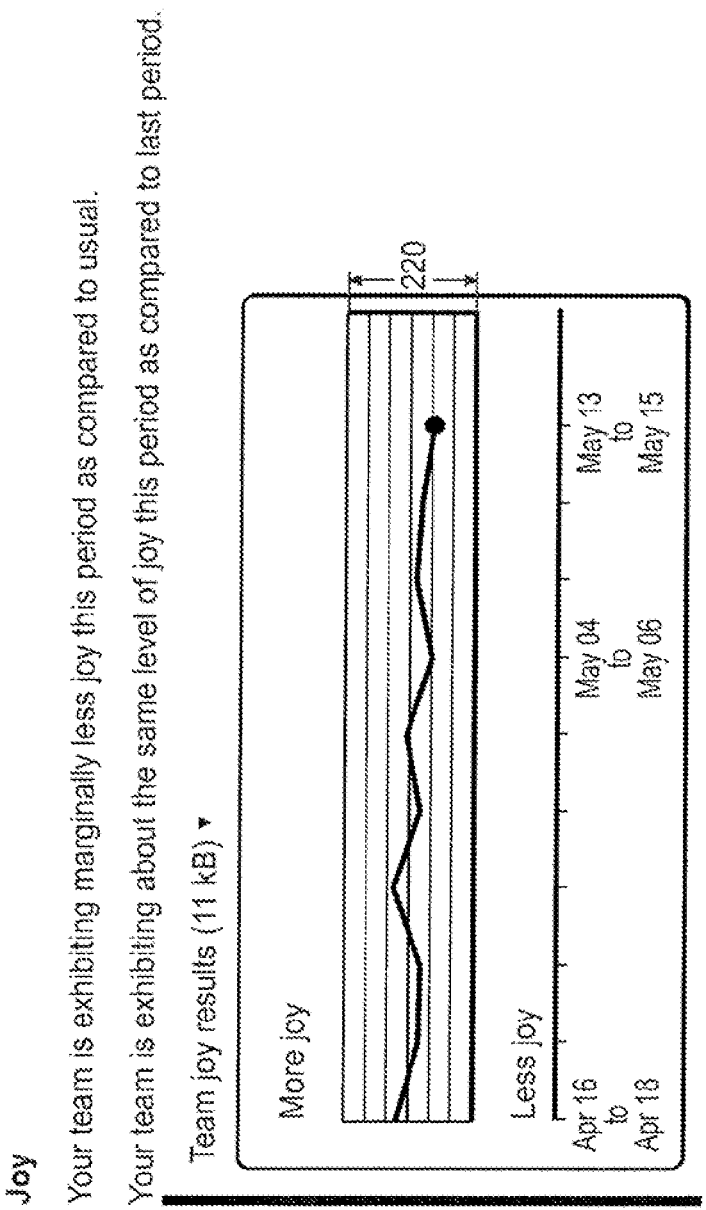
Figure 2C:
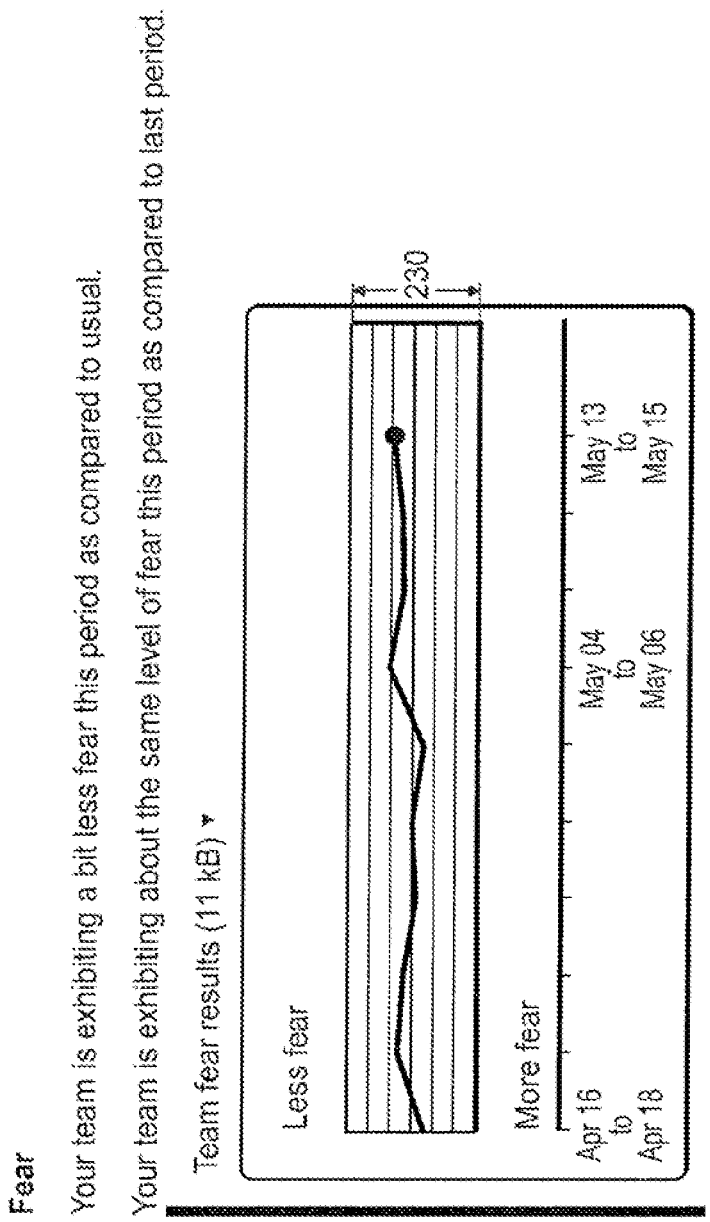
Figure 2D:
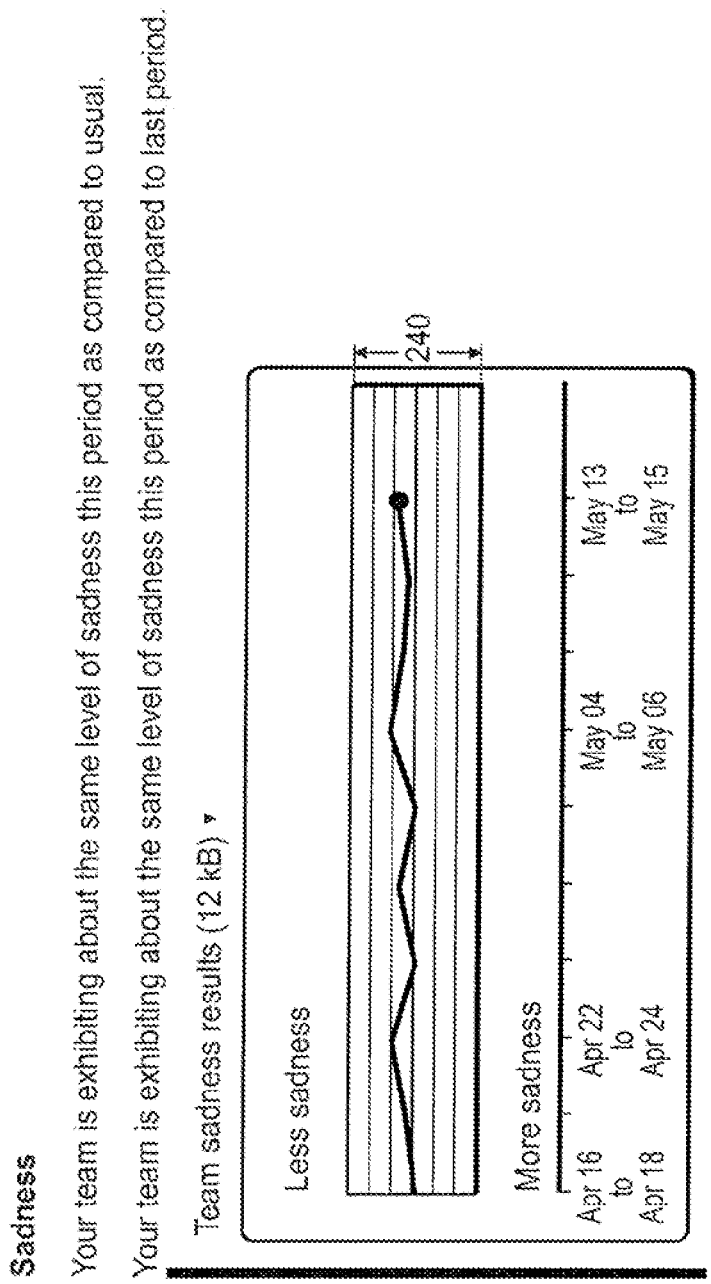
Figure 2E:
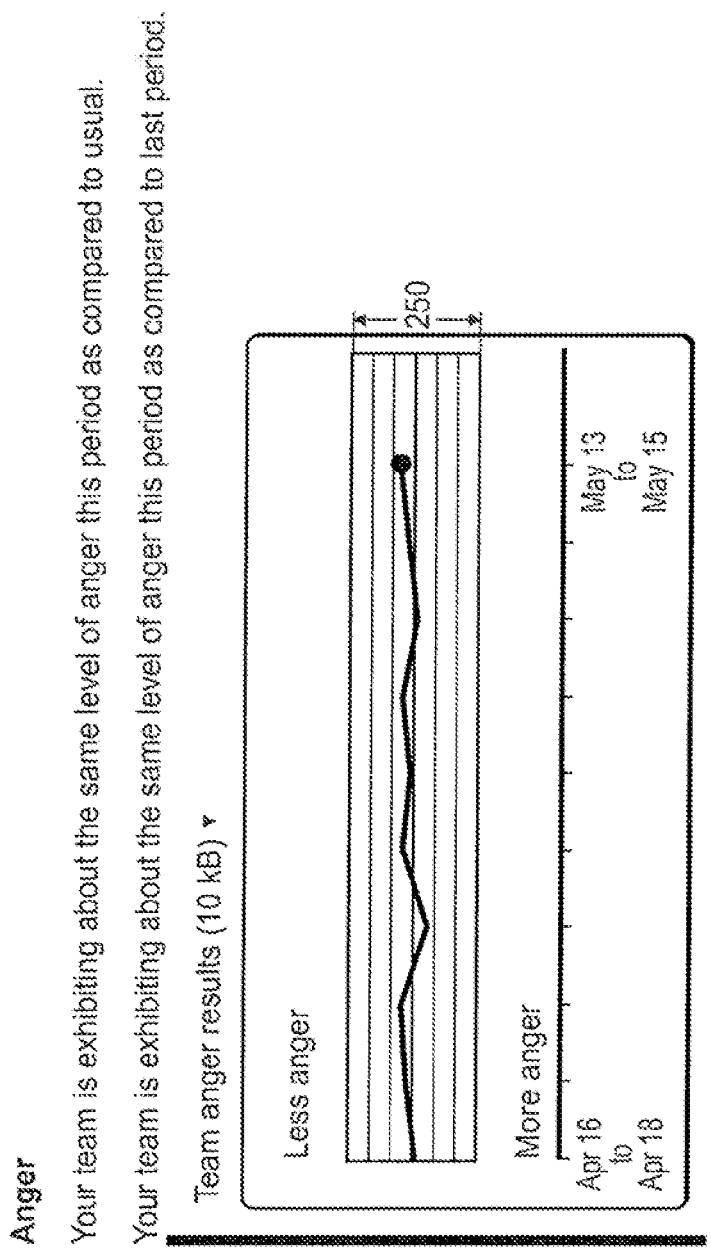

Referring to FIGS. 2(a) to 2(e), system 100 may output displays of the team's average level for several emotions. Particular scores may be less relevant than scores graphed over time. FIG. 2(a) shows the number of messages 210 sent among members of the team, as a function of time. In FIG. 2(a), each "tick mark" 212 represents three days (so the entire graph represents a trailing thirty-day period), and the graph shows that the number of messages is gently declining over that thirty days. FIG. 2(b) shows that the team's level of joy 220 is marginally below the thirty-day average. FIG. 2(c) shows that the team's level of fear 230 is lower (better) than over the thirty-day average, and slightly lower than the previous three-day period. FIG. 2(d) shows that the team's level of sadness 240 is about the same as the thirty-day average, and about the same as the previous three-day period. FIG. 2(e) shows that the team's level of anger 250 is about the same as the last thirty days, and about the same as the previous three-day period.

Figure 2F:
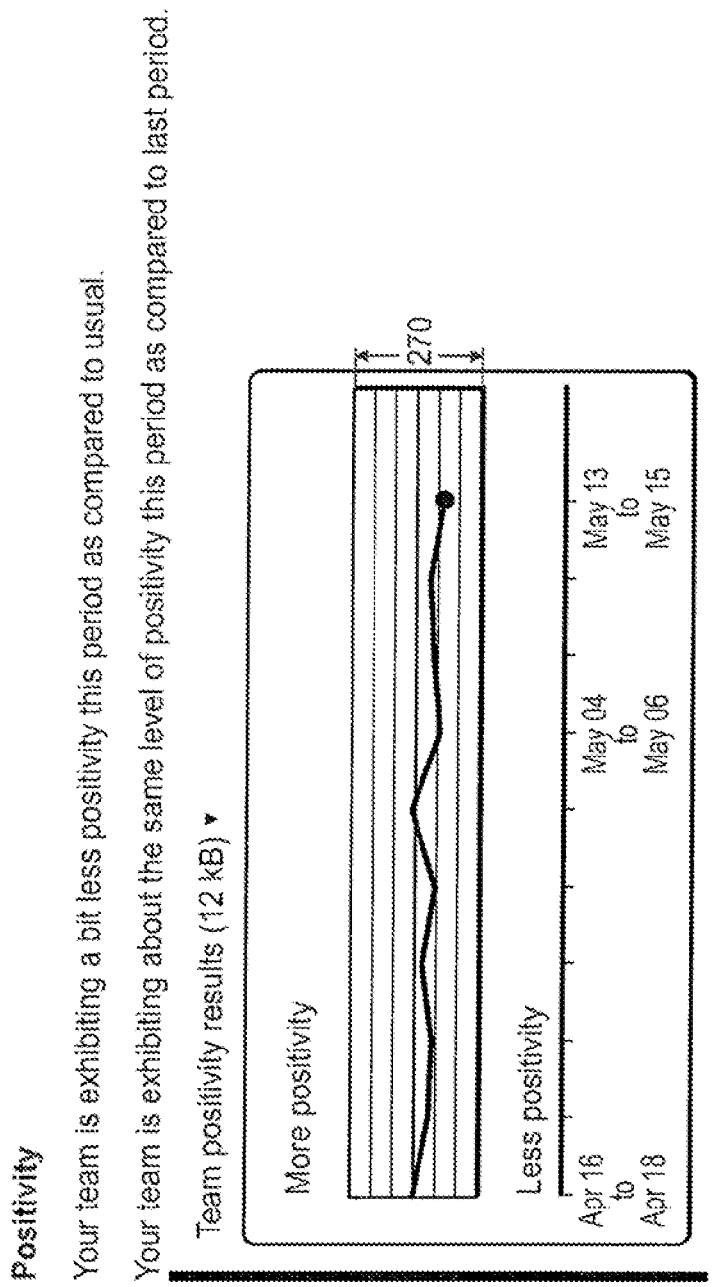
Figure 2G:
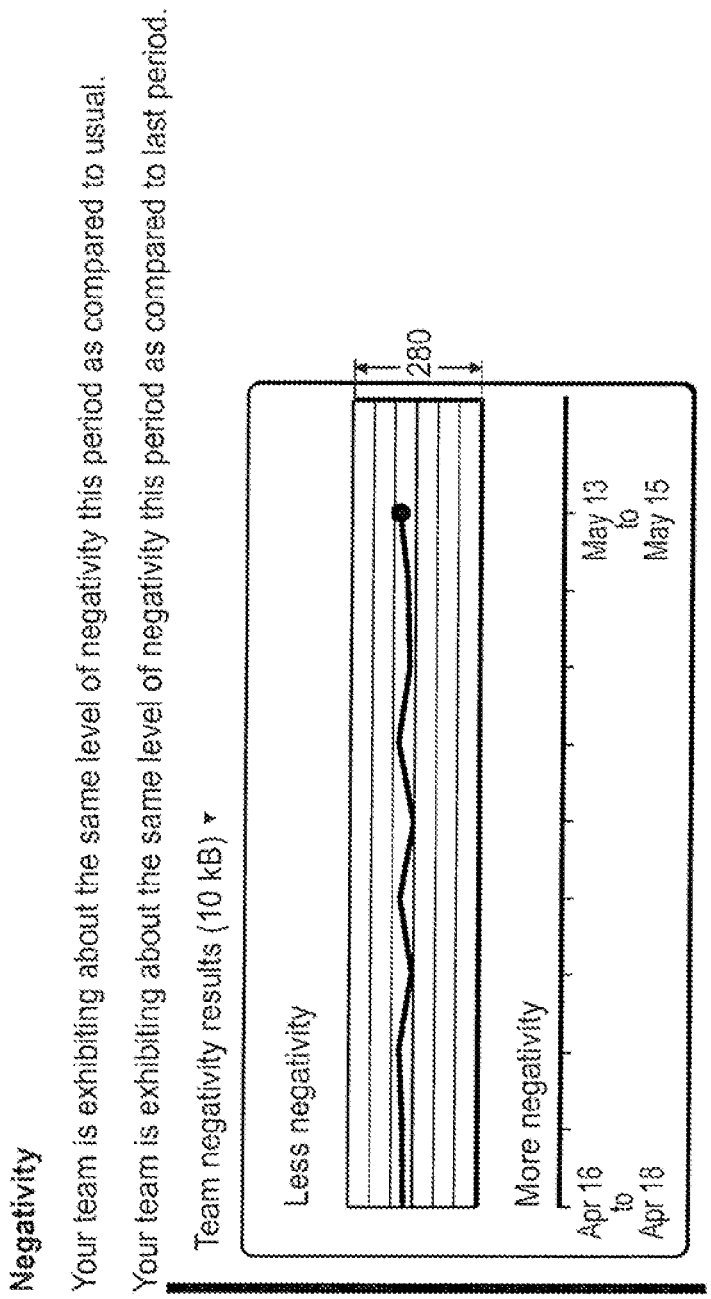

Referring to FIGS. 2(f) and 2(g), sentiment levels may likewise be graphed over time. FIG. 2(f) shows that positive sentiment 270 is slightly below its average for the thirty-day period, and about the same as the previous three-day period. FIG. 2(g) shows that negativity 280 is roughly stable over a thirty-day period, and about the same as the previous three-day period.

I.A. Modeling Allostatic Load and Emotional State of Individuals and Collective Allostatic Load and Emotional State of Teams System 100 may differentiate stress, allostatic load, and emotional state for individual team members and/or emotional state and CAL for the team as a whole. Techniques for estimating stress and allostatic load for individuals (including ecological momentary assessments and retrospective surveys, and other external validation methods, see section VI) may be applied to team members, and extended to analyze teams, and used to train and tune system 100 models, as follows.

I.A.1. Individual Allostatic Load

Figure 3A:
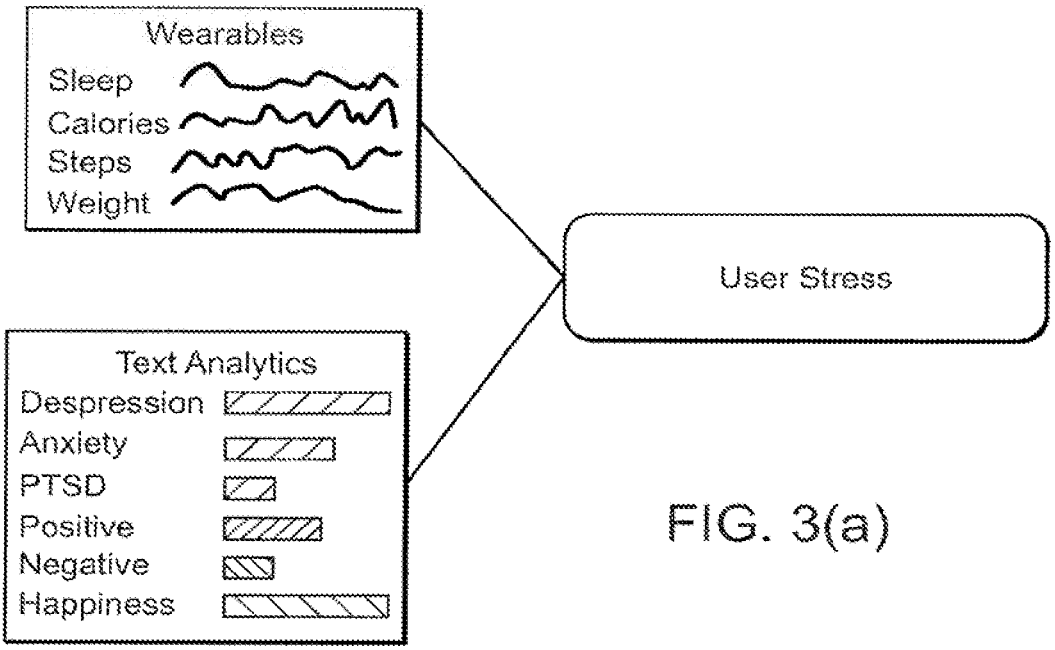
FIGS. 3(a) and 3(b) are schematic drawings showing correlations between computed results and human emotional state.

Referring to FIG. 3(a), cortisol, the hormone associated with stress, has deleterious effects on an individual's body, especially with prolonged exposure (i.e., prolonged stress). Cortisol levels change moment-to-moment in response to the environment, and often are directly measured through analysis of the saliva. Salivary cortisol measurements have been used in occupational stress studies to obtain a biomarker for stress response, and are often correlated with self-reported stress. Measurement in this manner is highly disruptive to the team, prohibitively costly, and not practical for near-real-time assessment. However, prolonged exposure to elevated cortisol levels has certain widely observed effects on the body, which can be passively and unobtrusively monitored: appetite change, weight change, sleep disturbance, and greater use of negative emotion, anxiety, anger, and sadness-related language in written communications. So while it is not practical to measure salivary cortisol repeatedly for a large number of teams, we can observe the effects of prolonged cortisol (and thus, allostatic load) in the digital life data of individuals.

Existing models of estimating when a person is showing the deleterious effects of stress may be applied and extended. The effects of prolonged stress (cortisol exposure) on the body are known, and used to design an overall metric of individual health and well-being (e.g., low depression scores, high well-being scores, stable or dropping weight, stable or rising activity levels). Various properties, measured unobtrusively (see section II.A) may be used to detect psychological signals and mental health conditions. System 100 may compute a combined seminary metric for the individual to quantitatively estimate if they are under stress.

I.A.2. Team Stress and Collective Allostatic Load

Figure 3B:
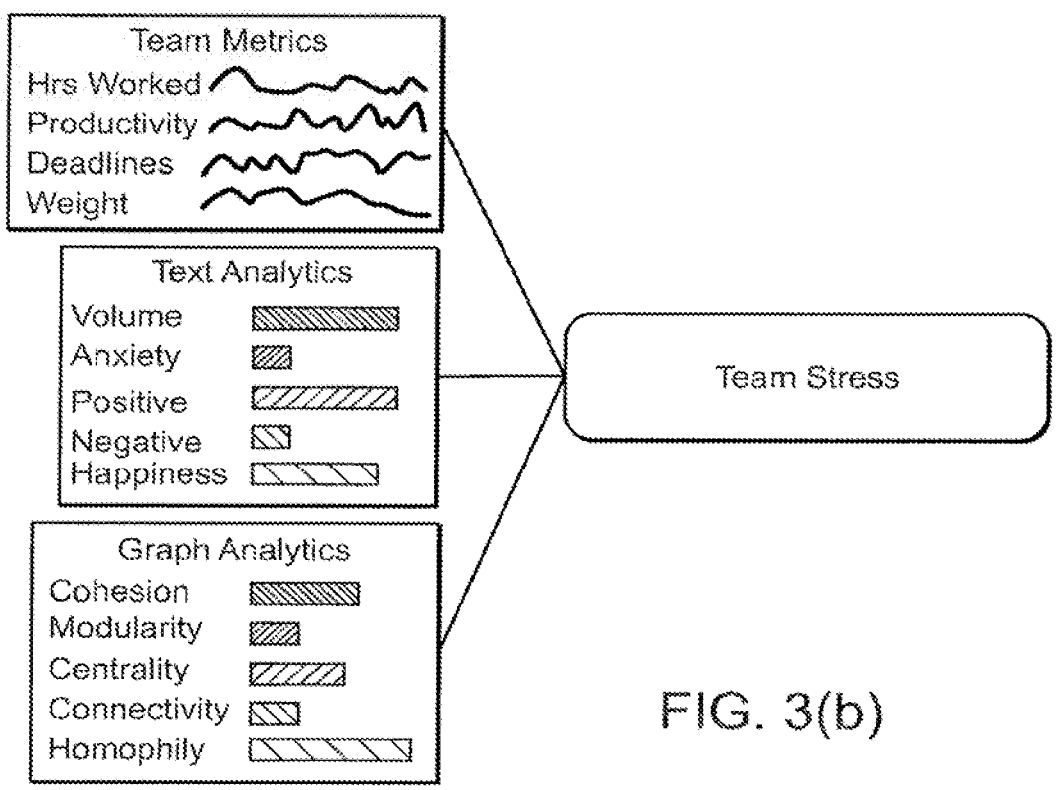

Referring to FIG. 3(b), a team operating under CAL or emotional load passes that stress along to the individuals on that team, and that individuals that endure prolonged stress have noted measurable physical effects. System 100 may provide an estimate of CAL and CAL-resilience through observing the team stressors and seeing how much such team stressors are evident in the individuals that comprise the team. Effectively, system 100 may estimate collective allostatic load through subtraction of collective individual stress from observed team stressful events.

Figure 3C:
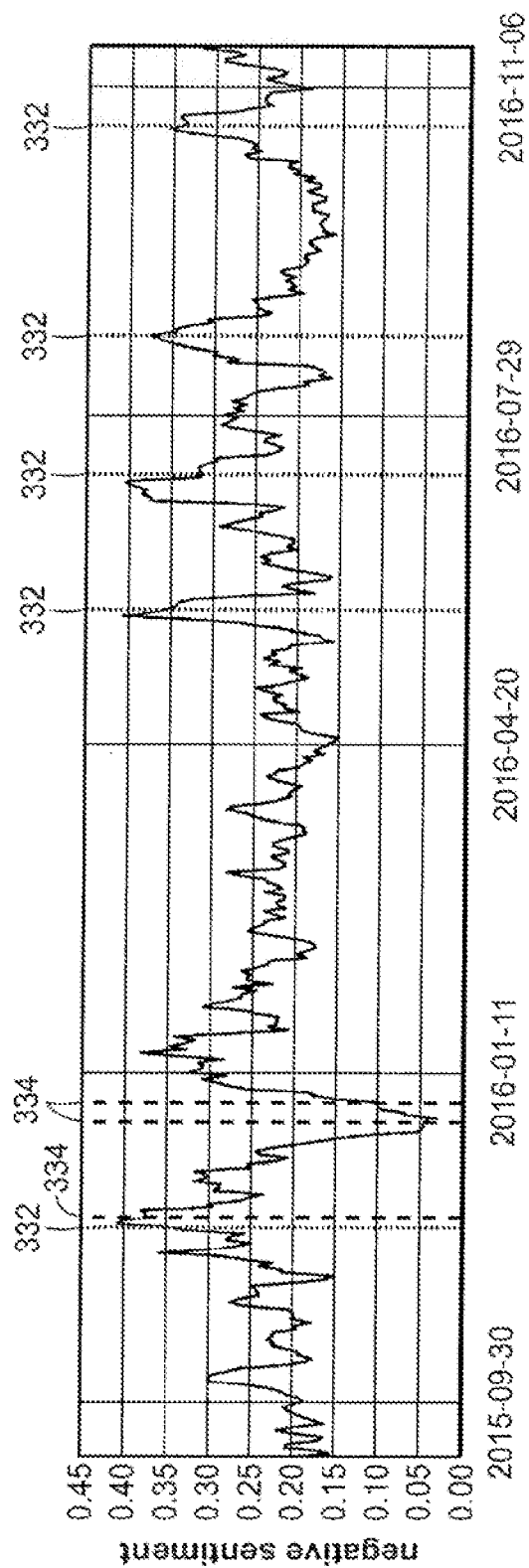

Referring to FIG. 3(c), similarly to the models of individual stress, system 100 may estimate effect of stressful events that each team experiences, from the wide array of data (see, e.g., section II.A). For example. FIG. 3(c) plots a rolling average of the proportion of a team's messages that are estimated to be negative sentiment. FIG. 3(c) demonstrates a link between stressful times at a company and the proportion of messages sent amongst the team that were estimated to contain negative sentiment. Vertical dotted lines 332 indicate external software deliverables—a highly stressful time for this company—and vertical dashed lines 334 indicate major holidays. For this team, at least, increased rates of negative sentiment occur coincident with deadlines. This provides some evidence that analyzing team communications with psychological variables can produce some meaningful measures related to team stress. Models of team stress may be extended and improved as system 100 gathers more data about more teams.

System 100 may provide a data collection and analysis framework to develop robust empirical metrics for team performance and optimal team composition and quantitative and predictive measures to describe a team or group's trend towards resilience or dysfunction. A scalable and repeatable method for quantifying the strains placed on teams may support research into understanding development of causal mechanisms leading to resilient or dysfunctional teams, and how to provide supportive environments to improve team function. The ability to quantitatively measure a team's or group's CAL at desired scales and frequencies may enable predictive capabilities regarding the resilience of individuals and teams to operate under CAL (CAL-resilience).

II. TECHNICAL IMPLEMENTATION

II.A. Passive Monitoring, Integrating Data from Multiple Dimensions

Referring again to FIGS. 1(a), 1(b), and 1(c), software 100 may use persistent and passive monitoring of team communications 112, environmental monitoring 114, etc. When monitoring is passive, team members need not act to "turn it on," which allows for the data collection to be more persistent, reducing sampling error and bias (e.g., participation bias could favor participation from those who have free time to do so, while those team members under higher allostatic load will not as easily make the time). The persistence allows for capturing of data that may, in turn, permit analysis for cyclic factors, and correlations of mental state to external factors (such as deadlines). Understanding team members' emotional and sentiment states, collective allostatic load, and human performance and how they are affected by other team members' actions, external stimuli, and cycles of allostasis may allow leaders to build teams that are more resilient to stressors and minimally affected by allostatic load. Real-time monitoring may provide teams with predictive tools for understanding current and future states, and provide a framework and objective measures for optimizing those states, and may permit this analysis to be performed at scale across an entire team, even a large team. This, in turn, may permit a quantifiable and replicable method for assessing the resilience and functioning of a team, and thus how to optimize the team's ability to carry and perform under allostatic load.

Digital life data 110, 112 is known to be a relevant indicator of an individual's mental health and well-being. Digital life data 110, 112 is broadly defined as the digital trail that a person makes while living their life interacting with devices. System 100 may examine a wide aperture of the data that a person generates, collected unobtrusively and with permission. Specifically, system 100 may collect and analyze:

Individual passive telemetry indicating location (from smartphone, GPS location sensors, badge proximity sensors), physiological measurements (wearable sensors, accelerometers, Fitbit, Jawbone, and other fitness and health trackers), individual wearable body sensors to capture pulse, temperature, moisture, movement; sleep, heart rate; heart rate variability; etc. and similar Internet-of-Things devices (pacemakers, body cameras, haptic sensors, etc.)

Data about an individual person that may be actively entered by the person-survey data, workout or diet data entered into an app, etc. Examples may include psychological scales administered via mobile device (e.g., depression, Anxiety, Stress Scales [DASS], Patient Health Questionnaire [PHQ]).

Individual biological data: cortisol measurements as obtained via plasma or saliva, medical imaging data, EEG assessment, glucometer readings, genetic markers, and other sampling of environment behaviors and experiences, for example, as described in Saul Shiffman, Arthur A. Stone, and Michael R. Hufford, Ecological momentary assessment, Annu. Rev. Clin. Psychol. 2008.4:1-32, incorporated by reference.

Communications with others, both intra-team and externally (email, text, Slack, Instagram, social media posts, etc.)—both the content of messages themselves and metadata (posting frequency, time of day, location, patterns of interactions with fellow community members)

Environmental and exogenous events: weather, major news events, weather, room temperature, humidity, sound level, and the character of sound (conversation, music, nature sounds, machine white noise, machine banging noise).

Some of the collected data may relate to individuals, some to the team as a whole (for example, office environmental measurements, company and team calendars and scheduling systems, software delivery dates, company news, social media posts on behalf of the company, and the like).

In addition, system 100 may collect data about events relevant to either individual team members or the team as a whole. The intra-team component of digital life data, called digital work-life data, may also be relevant to evaluating emotional state and trends, sentiment and emotional state and trends, CAL, of a team. The dyadic (that is, team members in pair-wise communication) and team nature of digital work-life data allows for analysis of inter-team-member communications, using analyses similar to those known for analyzing psychological state of individuals (see section VI, below). In addition, system 100 may collect properties of the team, such as team hires or attrition, company events or financial announcements, project milestones or support tickets opened or closed, company achievements, revenue, mission success rate, or support tickets opened or closed, and other digital signals capturing workplace interactions.

System 100 may obtain data relating to (1) individual team-related linguistic signal, (2) individual non-team-related linguistic signal, (3) individual extralinguistic signal, (4) linguistic features of team communication, and (5) collective team extralinguistic signal. Generally, the data collected by system 100 may track the quantities known to be relevant through the scholarly literature.

In some cases, individual data streams (such as Slack messages, text messages, or intra-team messages) may have captured a large-enough spectrum of team communications to allow system 100 to show mental health, well-being, or stress state. The ability of system 100 to identify psychological phenomena may improve as more data streams are integrated. System 100 may integrate technology for the collection and estimation of psychologically relevant signals from these data, and will put them to use to predict personal and CAL.

System 100 may incorporate data 110 from Slack, a popular work communication platform that replaces email, chat and some video-calling capabilities. Slack is a cloud-based messaging app and set of team collaboration tools and services, designed for use in work groups. Slack centralizes and connects messages, file sharing, decisions, video conferencing, and other workflow conversations among a work group. Because Slack collects and coordinates team communications, system 100 may use the Slack repository as a convenient access point for team communications.

Figure 6A:
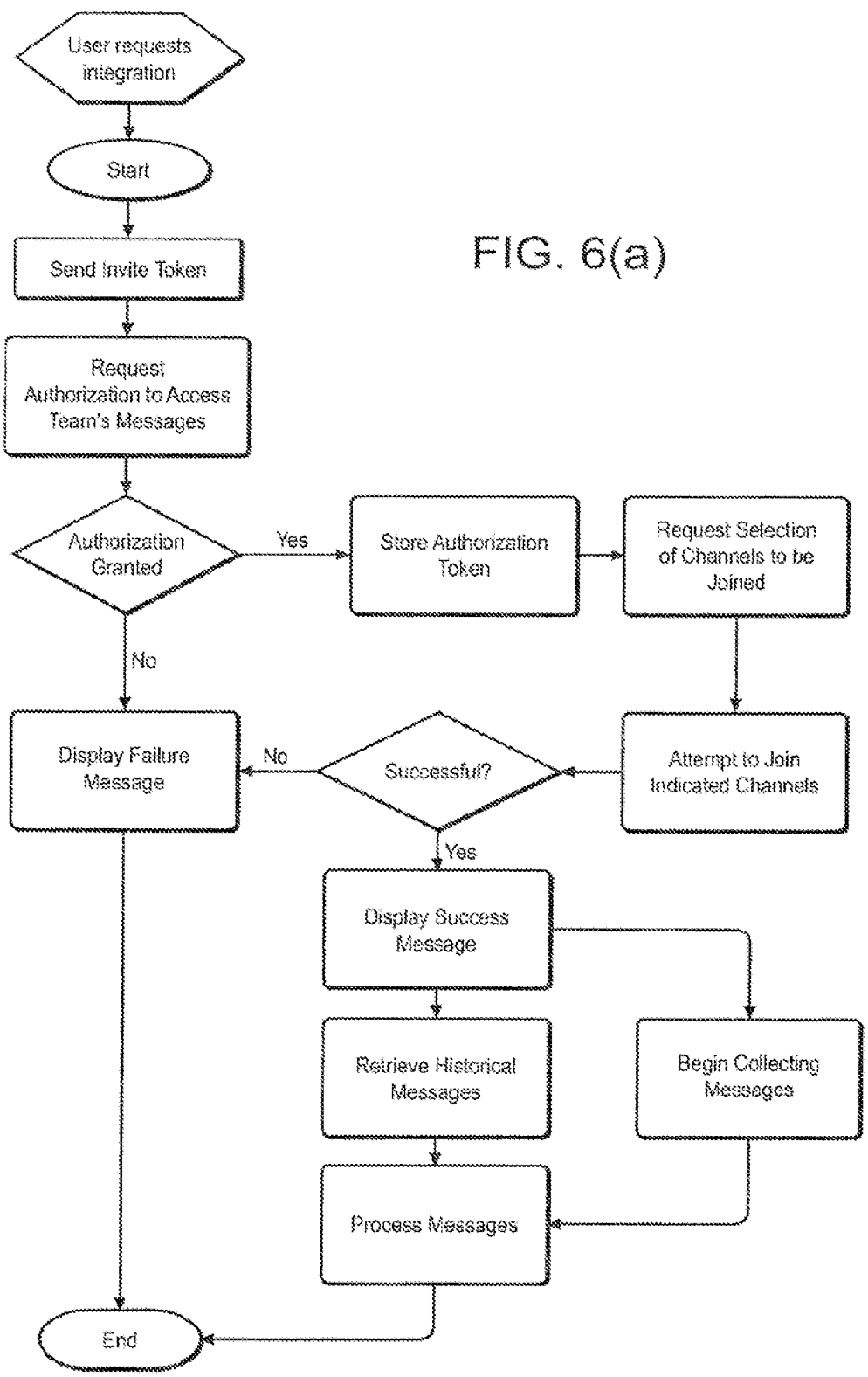

Referring to FIG. 6(a), integration of system 100 with Slack or a similar messaging system may begin by having system 100 gain access to the team's Slack messages and telemetry in whatever database or data feed 110, 112, 114, 116 they are initially stored in. A system administrator or team leader may authorize Slack to treat system 100 as an authorized user. As authorizations are received, system 100 may collect and integrate messages and data, and process them.

The software may evaluate Slack messages 110, other social media messages (including Twitter, Facebook, Instagram, Tumblr, Reddit, Fitbit, Runkeeper, and Jawbone), email, SMS text messages 112, work communications, design, project plan, and financial memoranda and other long-form written communications, non-work personal communications (such as team members' personal social media posts), issue tracking and project tracking software, and any other digital data 114, 116 that may reflect or influence emotional state and sentiment of team members, or interactions within the team. The system may poll team members or use sensors to collect information about sleep, stress, family events and stresses, team dynamics, etc. Linguistic analysis may be cross-correlated with actions detected by a personal wearable device or information about external events to provide further insights and predictions about the team dynamics.

The software may be designed to tolerate partial data. For example, some team members may have a wearable device like a Fitbit, and others not. The missing data may lead to a slightly sparser picture of individual and team functioning, but measuring CAL in the team will still benefit from the team members who have that data source. System 100 may be designed to be agnostic to which input variables are available, for example, by normalizing the data into an agnostic form (e.g., Fitbit and Jawbone capture movement differently, but both will be translated to some sensor-agnostic normalized unit of movement like "number of steps" or "deviation from baseline amount of movement") and subsequent statistical analysis and machine learning will be designed for robustness to this sparsity.

II.B. Emotion and Sentiment Analysis

Emotional sentiment analysis 130 may be used to assess emotional content or sentiment in respective messages.

For example, emotion analysis 132 may analyze for emotions such as joy, sadness, surprise, anger, and fear (and a residual category for messages that express no emption). Sentiment 134 may be classified as positive, negative, or neutral—the scale may have three points, or many depending on strength of the sentiment expressed. Sentiment may be evaluated using techniques such as those discussed in Peter D. Turney, Thumbs Up or Thumbs Down?Semantic Orientation Applied to Unsupervised Classification of Reviews, Proceedings of the 40th Annual Meeting of the Association for Computational Linguistics (ACL), Philadelphia, pp. 417-424 (July 2002), or available emotion recognition API's discussed at Bill Doerrfeld, 20+ Emotion Recognition APs that Will leave You Impressed, Concerned, Nordic APIs Blog, incorporated by reference.

In particular, system 100 may extend the use of linguistic analysis to team communications, and may include direct measurements of dyadic relationships between coworkers, and social network analyses for analysis of the team as an organism. The Coppersmith et al. 2017 paper, Scalable mental health analysis in the clinical whitespace via natural language processing (see section VI, below), describes a possible implementation, and is incorporated by reference. An article by Thomas Hellwig, Caroline Rook, Elizabeth Florent-Treacy, Manfred F. R. Kets de Vries, *An Early Warning System for Your Team's Stress Level*, Harvard Business Review (Apr. 26, 2017), https://hbr.org/2017/04/an-early-warning-system-for-your-teams-stress-level, suggests another set of factors that might be collected and analyzed by a human manager, though does not suggest a mechanism for collecting the data or analyzing it by computer (the Hellwig paper is incorporated by reference). The data collected by system 100, and the analysis of system 100 (see, for example, section II.D) may allow a practical implementation of Hellwig's metric. Large-scale measures of well-being in the workplace are collected as part of the General Social Survey by the CDC's National Institute for Occupational Safety & Health (NIOSH).

Emotional and sentiment analysis 130 can be performed by known software systems, such as VADER (for Valence Aware Dictionary for sEntiment Reasoning), developed at Georgia Institute of Technology. Techniques used in emotion and sentiment analyses 130 may be variants on those discussed in Glen Coppersmith, Kim Ngo, Ryan Leary, Anthony Wood. Exploratory Analysis of Social Media Prior to a Suicide Attempt, Association for Computational Linguistics, Proceedings of the 3rd Workshop on Computational Linguistics and Clinical Psychology: From Linguistic Signal to Clinical Reality, San Diego, Calif., pages 106-117 (Jun. 16, 2016) http://www.aclweb.org/anthology/W/W16/W16-0311.pdf and Clayton J Hutto and Eric Gilbert, VADER: A Parsimonious Rule-based Model for Sentiment Analysis of Social Media Text, Association for the Advancement of Artificial Intelligence, Proceedings of the Eighth International AAAI Conference on Weblogs and Social Media, Ann Arbor, Mich. (2014), http://www.aaai.org/ocs/index.php/ICWSM/ICWSM14/paper/download/g109/8122, Jeffrey Pennington, Richard Socher, Christopher D. Manning, GloVe: Global Vectors forWord Representation, Association for Computational Linguistics, Proceedings of the 2014 Conference on Empirical Methods in Natural Language Processing (EMNLP), pages 1532-1543. Doha, Qatar, DOI: 10.3115/v1/D14-1162, (Oct. 25-29, 2014), and Fabio Calefato et al, EmoTxt: A Toolkit for Emotion Recognition from Text, 2017 Seventh International Conference on Affective Computing and Intelligent Interaction Workshops and Demos (ACIIW). These papers are incorporated by reference.

System 100 may also process spoken language, either telephone communications, or oral conversations monitored by microphone. Emotional state and sentiment can be inferred from speech volume, speech speed, tone of voice, language and dialect spoken (of choice); formality of language, facial expression, body language, the spoken words of conversations.

Other channels may monitor other work observables, and infer emotional or sentiment state. For example, techniques may be used from Glen Coppersmith, Personalized mental health insights from Facebook and FitBit data, incorporated by reference.

The software may use machine-learning techniques. It may be trained on a large corpus of messages. As the software monitors each team, its analyses may be used as outcomes for training and evaluating a model of emotional load or CAL for teams, and validating, adapting, and improving the machine learning algorithms.

Some portions of the analysis may use n-gram analyses, which operate on character strings (n characters long) that are less than entire words. Other portions of the analysis may include unsupervised feature extraction at multiple scales, from simple character features to message and user-level embeddings trained on existing teams for which the system already has individual user and team conversation data.

Micropattern analyses generally focus on consecutive communications over a short time interval, for example a few messages or social media posts over a few hours. Possible implementation of micropattern analyses are discussed in Bryan et al., Predictors of emerging suicide death among military personnel on social media networks, American Association of Suicidology, Suicide Life Threat Behav. 2017 Jul. 28. doi: 10.1111/sltb, and Wiley-Blackwell, SUICIDE AND LIFE-THREATENING BEHAVIOR (in press), and Kate Loveys, Patrick Crutchley, Emily Wyatt, Glen Coppersmith, Small but Mighty: Affective Micropatterns for Quantifying Mental Health from Social Media Language, and Glen Coppersmith, Mark Dredze. Craig Harman, Quantifying Mental Health Signals in Twitter, Associational for Computational Linguistics, Workshop of Computational Linguistics and Clinical Psychology (2014), each incorporated by reference. Emotional wellness of the team as a whole may be implemented using techniques discussed in Coppersmith G, Hilland C, Frieder O, Leary R. Scalable mental health analysis in the clinical whitespace via natural language processing. In: Biomedical & Health Informatics (BHI), 2017 IEEE EMBS International Conference, IEEE; 2017. p. 393-396, DOI: 10.1109/BHI.2017.7897288, available from http://ieeexplore.iee.org/abstract/document/7897288, each incorporated by reference. The papers incorporated by reference in the '486 and '637 provisional applications are incorporated by reference.

Figure 4:
FIG. 4 shows a database entry storing decoration of a text message.

Referring to FIG. 4, the output of message-level analytics 130 may be a set of messages (or other individual sensor observations) each enriched with additional attributes, such as:
- the message itself (perhaps as a pointer to the storage of the message text in the original database)
- the people involved: from, to, cc
- timestamp 410
- scope (what level of object was evaluated—a single message, a longer conversation, or the like),
- analytic (what class of attribute is being evaluated by this enrichment object-a sentiment, an emotion, etc.) 422
- analytic_language (English, or other) 424
- value (the value for the analytic) 426
- confidence (the probability that "value" is correct) 428

For example, micropattern analysis may consider sets of consecutive messages, evaluate each message for sentiment, and reduce the sequence to a tuple of sentiment scores. For example, a set of three messages may each be evaluated for sentiment (positive or negative), and recorded as a 3-tuple {positive, positive, negative}.

II.C. Processing to Locate Patterns and Provide Evaluations

Each message may be evaluated for emotion 132 and sentiment 134. The evaluation may be probabilistic, in that each emotion and sentiment may be evaluated to some probability 428. In some cases, system 100 may enrich the storage of each message with one or more "emotion" embedded object properties 432, and one or more "sentiment" properties 434. Alternatively, in some cases, system 100 may choose the single most probable emotion or sentiment, and store only that single emotion or sentiment property 432, 434 as an enrichment of the message. The enriched message may be stored in a database, for example a SQL relational database, or a NoSQL organization (key-value, wide column, sparse, etc.) such as Logstash, with a search engine such as ElasticSearch.

Data from other channels may be used to confirm emotion or sentiment inferences drawn from the text, or otherwise merged into the conclusions, using techniques such as those of Soujany Poria, Erik Cambria, Newton Howard, Guang-Bin Huang, Amir Hussain, Fusing audio, visual and textual clues for sentiment analysis from multimodal content, Neurocomputing 174 50-59, DOI 10.1016/j.neucom.2015.01.095 0925-2312 (2016), incorporated by reference.

II.D. Network Analysis

II.D.1. Assembling the Multiplex Graph

Figure 5:
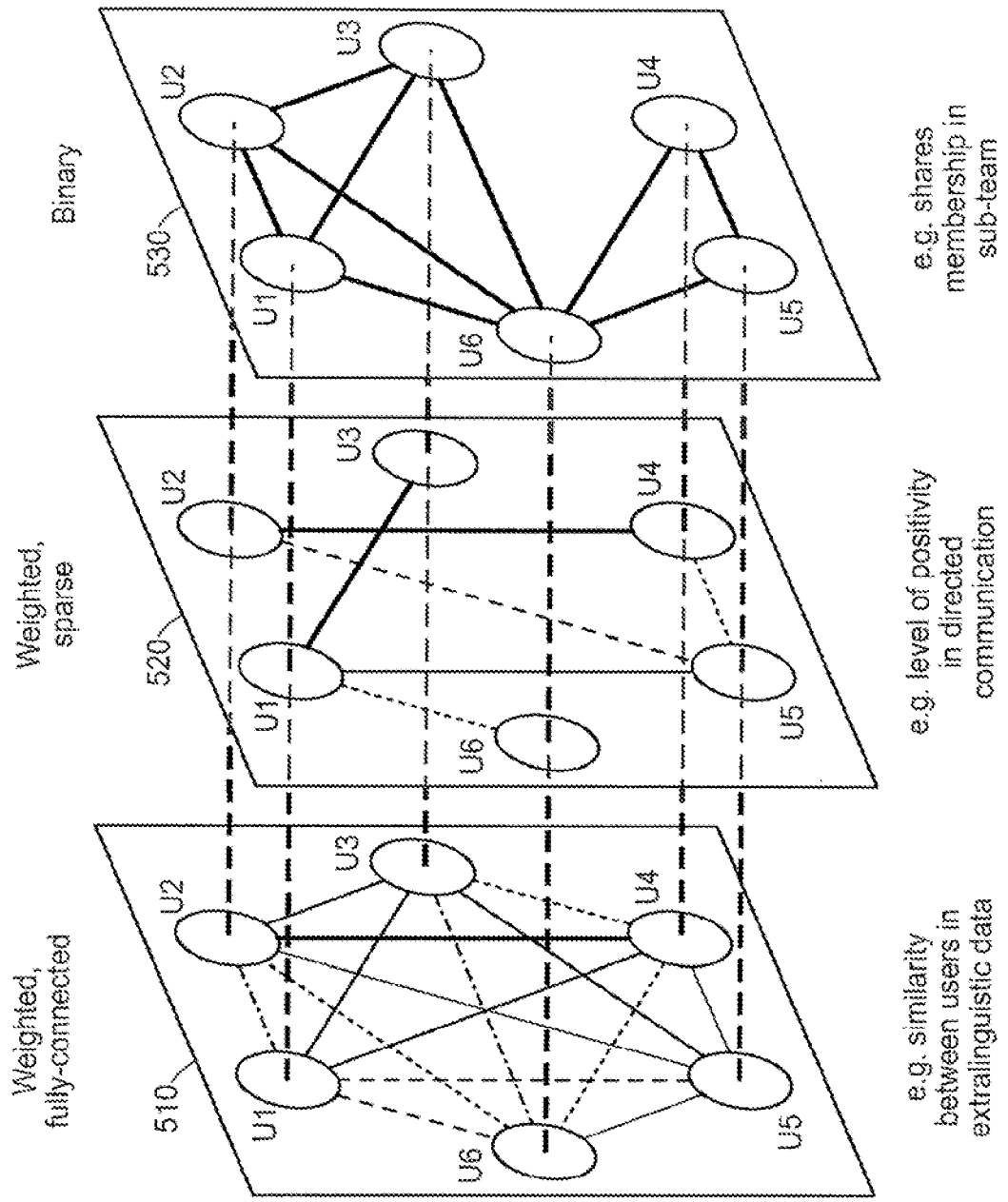
FIG. 5 is a schematic figure showing a graph representation of data.

Referring to FIG. 5, with the data collected (the data discussed in section II.A and any other), system 100 may calculate a collective allostatic load (CAL) based on a graph model relating all of these signals across the team, and across time. System 100 may model the team as a graph. The graph may model each person as one of the nodes of the graph, with each node annotated by a characteristic vector of individual signals from predictive linguistic model output, raw linguistic features, and extralinguistic features. Each edge of the graph may model a dyadic pair of team members, and may be annotated by characteristics of the interactions between the pair. System 100 may draw on existing graph theory techniques and network science to develop, apply, and refine a set of graph metrics that will characterize and quantify the model statically and across time.

Team emotional sentiment and dynamics may be evaluated based on the dyadic relationships among each pair of team members, or based on multiplex networks (a multiplex network is a multilayer network where each layer has the same set of nodes, and all connections lie in a single layer, and interconnections cannot cross layers, see https://en.m.wikipedia.org/wiki/Multidimensional_network). A team may be modeled as a multiplex graph to capture different types of dyadic relationships between users. The edges in each layer of the graph may capture a separate relationship between pairs of team members, including:

a) Binary edge that exists if the two team members interacted directly (emailed one another, had an internal chat conversation, "@" mentioned one another on Slack);

b) A weighted edge representing proportion of positive language in the direct communication between team members, e.g., predicted from models of sentiment or emotion;

c) A weighted edge representing proportion of negative or angry language in the direct communication between team members, again predicted from models of sentiment or emotion;

d) A weighted edge representing the similarity of the pair's linguistic features (e.g., IDF-weighted cosine distance between feature vectors);

e) A weighted edge representing the similarity of their extralinguistic features; and f) A binary edge that exists if two team members are in the same smaller subteam or functional unit (e.g., defined a priori from the team's org chart).

In FIG. 5, a multiplex network has three layers, one for each quantity measured. This team consists of six user nodes; dotted lines between layers represent identity relationships, i.e., U1 is the same user in all layers. The leftmost layer 510 illustrates an example with weighted edges between users, that is, edges may have values over some range, shown as lines varying from white, to various shades of grey, to black. These might be real-valued variables, or variables with a number of discrete values. An example might be the similarity in vocabulary between the two users at the two end nodes of an edge. These measurements allow comparisons between each pair of users regardless of whether they have interacted. The middle layer 520 contains weighted edges where some dyads are not observed (e.g., level of positivity in directed communications between the pair of users, where some user pairs may not have communicated). The rightmost layer 530 represents binary (unweighted) edges (e.g., membership on a subteam, where all subteam members are connected).

System 100 may use a wide-aperture approach to the creation of layers in this multiplex network—examining a wide range of possible features with a plausible link to aspects of CAL supported by the literature. These layers will be empirically evaluated for both for utility in measuring CAL and for correlation between one another. Layers that are duplicative or uninformative (in the machine learning sense) to the measurement of CAL can then be excluded from further analysis. Dimensionality reduction may be applied to reduce computational load, while retaining as much user-level variance as possible. Information directly relevant to CAL, like predicted psychological events and associated risk, may be more-likely retained to retain interpretability.

Known text analytics capabilities (130, 132, 134 of FIG. 1(*b*)) allow feature extraction from team text at multiple scales. These text analytics permit analysis of text to predict emotional content, mental health signals, psychologically-relevant events, and suicide risk. Other capabilities include unsupervised feature extraction at multiple scales, from simple character features to message- and user-level embeddings trained on existing teams for which we already have individual-user and team-conversation data.

II.D.2. Analyzing the Multiplex Graph

From a graph representation 510, 520, 530 of the team (node characteristics for individual members, with a multiplex network of edges for team relationships), techniques from graph theory may be used to evaluate the network as a whole, for example: community detection and modularity metrics to uncover "cliques" in the team, and how fractionated or "balkanized" the team is; measures of graph connectedness to assess overall level of intrateam communication; measures of graph centrality to determine putative influencers in the team (additional temporal information may be used to test the quality of the inferences drawn from the graph, including the identification of influencers). Metrics may be assessed both a priori and in light of real team data to assign direction of relationship with CAL.

The multiplex graph 510, 520, 530 may reveal properties and CAL of the team. For example, high connectivity in the positive-language layer of the network may reflect a team characterized by widespread positive interactions, leading to high resilience and low CAL. On the other hand, a high degree of modularity in the detected community structure of the positive-language layer (e.g., as described in M. Girvan and M. E. J. Newman, Community structure in social and biological networks, Proceedings of the Nat'l Academy of Sciences USA., vol. 99, no. 12, pp. 7821-7826 (Jun. 11, 2002)), of the positive-language layer would imply a team with cliques that interact well together, but not with the broader team, potentially leading to lower resilience and higher CAL Additional hypotheses may be developed and tested in light of existing organizational, management, and psychological literature.
 (a) Cliquishness (overall graph modularity across layers) leading to low resilience and thus high CAL.
 (b) Trends of increased physical activity among pre-defined supervisors or data-driven graph influencers (high-degree nodes) leading to lower overall CAL.
 (c) Detection of disaffected members, likely to contribute to higher CAL, which can be measuring as a decrease in linguistic similarity with the rest of the team (a drop in weighted degree in the linguistic similarity layer).
 (d) Non-effect of personality similarity (measured by edge weight in linguistic and extralinguistic similarity layers) leading to no relationship with peer and supervisor performance ratings, which are in turn related to CAL
 (e) Communication trends affecting team graph metrics are modulated by age, i.e., age as a controlling or predictive factor in measuring CAL from language.

II.D.3. Recommendations

Recommendations for future action may be directly informed by the definitions of graph metrics described above, and by the directions of those metrics' associations with CAL If cliquishness is found to be positively correlated with CAL, modularity can be increased within the organization by identifying members from disparate cliques and putting them in close collaboration with each other. Since a clique is defined as a collection of nodes (individuals) with greater within-clique connectivity (similarity, volume of communications, etc) than connectivity with the rest of the organization, increasing connectivity between disconnected individuals could help to reverse the cliquishness-CAL trend. In more concrete corporate organizational terms, this could mean an individual from the sales department consulting with a research and development team, when he or she had not done so in the past. Organizations could also consider extracurricular activities to boost connectivity across cliques, like whole-company offsite retreats, putting individuals whose roles within the company are dissimilar into close contact.

If physical activity among "influencers" (highly-connected individuals in the graph) is found to decrease CAL, managers could recruit those individuals to promote physical activity among their close connections, perhaps even offering incentives to do so.

If disaffected team members are detected using the linguistic similarity layer of the graph, special efforts could be made to re-engage those members with the rest of the organization, perhaps by stimulating or promoting communication (task- and non-task based) between those members and those who share other connections (same projects, similar personality measures) with them.

The recommendation algorithm may be adaptive. That is, the history of interventions will be recorded alongside the time series data and we will analyze the effect that, e.g., deliberately increasing cross-clique communication and collaboration has on the team's multiplex graph metrics and resulting measured CAL. In this way the system is closed-loop; experimental variations and perturbations may be conducted in as controlled a manner as possible, and effects of those experimental interventions measured to determine viability of future interventions to decrease CAL The graph may be further extended by limiting the scope of data to a specific temporal window, creating a representation of the team in time. Temporal patterns in collected data may be integrated with psychological theory to choose appropriate temporal windowing schemes for the final model. Examining graph metrics for the team over time may provide information on shifting relationships and overall team dynamics. In an analogy that considers the team as an organism, each graph metric can be thought of as a vital sign for the team at a given time—not inherently good or bad, rather a measure of whether the team is functioning normally or abnormally within its own bounds. Various metrics will have their own statistics, and variations against baseline may be correlated to various "health" or performance Over time, machine learning techniques may permit recognition of various metrics as leading indicators of team cohesion and productivity.

System 100 may incorporate security mechanisms to protect personal data, such as full-disk encryption for data at rest, and Transport Layer Security (TLS) encryption with client certificates for protecting any data in-flight. Security may be further enhanced by vector-based storage and processing mechanisms, which separate actual content from the graphs that process it.

II.E. Machine Learning and Training of Models

Additional direct data collection (the outcome measures with examples given above) may be used for further training to extract the graph metrics that are most relevant to "vital signs" for the team. Models may be refined or reweighted, low signal or low correlation information can be pruned, redundant information can be removed, all improving the measurement of CAL at improved computational efficiency.

Both fully-automated and semi-supervised machine learning techniques may be used to train the models. For example, emotion and sentiment labels generated by linguistic analysis phase 130 may be correlated with analyses derived from physical movement, sleep data, and other channels (see sections I.A.1 and II.A). The various models may be used as training data for each other (i.e., a per-day sentiment score is obtained through analysis of language data may be used to train a model to estimate sentiment from movement and/or sleep data).

Each data source for each person may be analyzed and the scores combined through a weighted average to assess the overall sentiment and emotion scores at a per-day level.

Telemetry data from other channels may be used to infer intermediate variables, which may in turn be used to improve analysis of emotion and/or sentiment. For example, location, room camera, and similar data may allow inference of the quality of sleep or sleep disturbance, or appetite changes. And that, in turn, may permit better analysis of text sources to infer of mood and emotion, and allow the system to disentangle multiple factors affecting an individual's mood and emotion. Use of each channel to cross-check and train other channels may improve the machine learning in the model for each respective channel. Model fitting may use techniques such as those discussed in Vladimir Vapnik and Rauf Izmailov, V-Matrix Method of Solving Statistical Inference Problems, Journal of Machine Learning Research 16 (2015) 1683-1730 (September 2015), and Sano and Picard, Stress Recognition using Wearable Sensors and Mobile Phones, 2013 Humaine Association Conference on Affective Computing and Intelligent Interaction, pp. 671-676 DOI: 10.1109/ACII.2013.117 (Sep. 2-5, 2013) incorporated by reference.

Environmental sampling of behaviors and experiences may likewise be used to infer emotional state, for example, as described in Shiffman, Stone, and Hufford, Ecological momentary assessment. This inference may be used as a cross-check on the inference derived from other channels, and to improve the machine learning model.

Automated mood recognition based on facial recognition may be used to confirm and cross-check emotional state inferred from text analysis. Machine learning techniques may be used to provide feedback to both systems to improve both channels of emotional recognition.

The software may be trained to develop a model based on (1) individual team-related linguistic signal, (2) individual non-team-related linguistic signal, (3) individual extralinguistic signal, and (4) linguistic features of team communication. CAL may be measured from a graph model relating all of these signals across the team, and across time. One possible graph model may consist of user nodes, where each node contains a characteristic vector of individual signals from predictive linguistic model output, raw linguistic features, and extralinguistic features. A dimensionality reduction scheme at this stage would keep the feature space tractable while retaining as much user-level variance as possible.

Key performance indicators (KPIs) may be extracted that correlate to the ability of a team to perform in adversity. Stressors affect different teams in different ways, and the ability to quantify the effect of adverse events on a team, to predict the team's reaction to such events, and for enhancing team resilience are critical in a wide range of applications in government and private sector organizations, especially teams in the knowledge economy. The graph metrics may provide quantifiable, scalable, and replicable methods for assessing the resilience and functioning of teams, providing guideposts for optimizing a team's ability to carry and perform under allostatic load. Early diagnosis of excessive allostatic load is critically important to teams whose primary function is cognitive, with strategic and highly technical roles.

III. REPORTS AND RECOMMENDATIONS TO REDUCE COLLECTIVE ALLOSTATIC LOAD

Reports may be generated periodically or on demand, to report team health to supervisors. Individual team members may retrieve metrics specific to them, and may be able to access some subset of team reports. In addition, reports may be generated automatically with a recurring frequency.

Figure 6B:
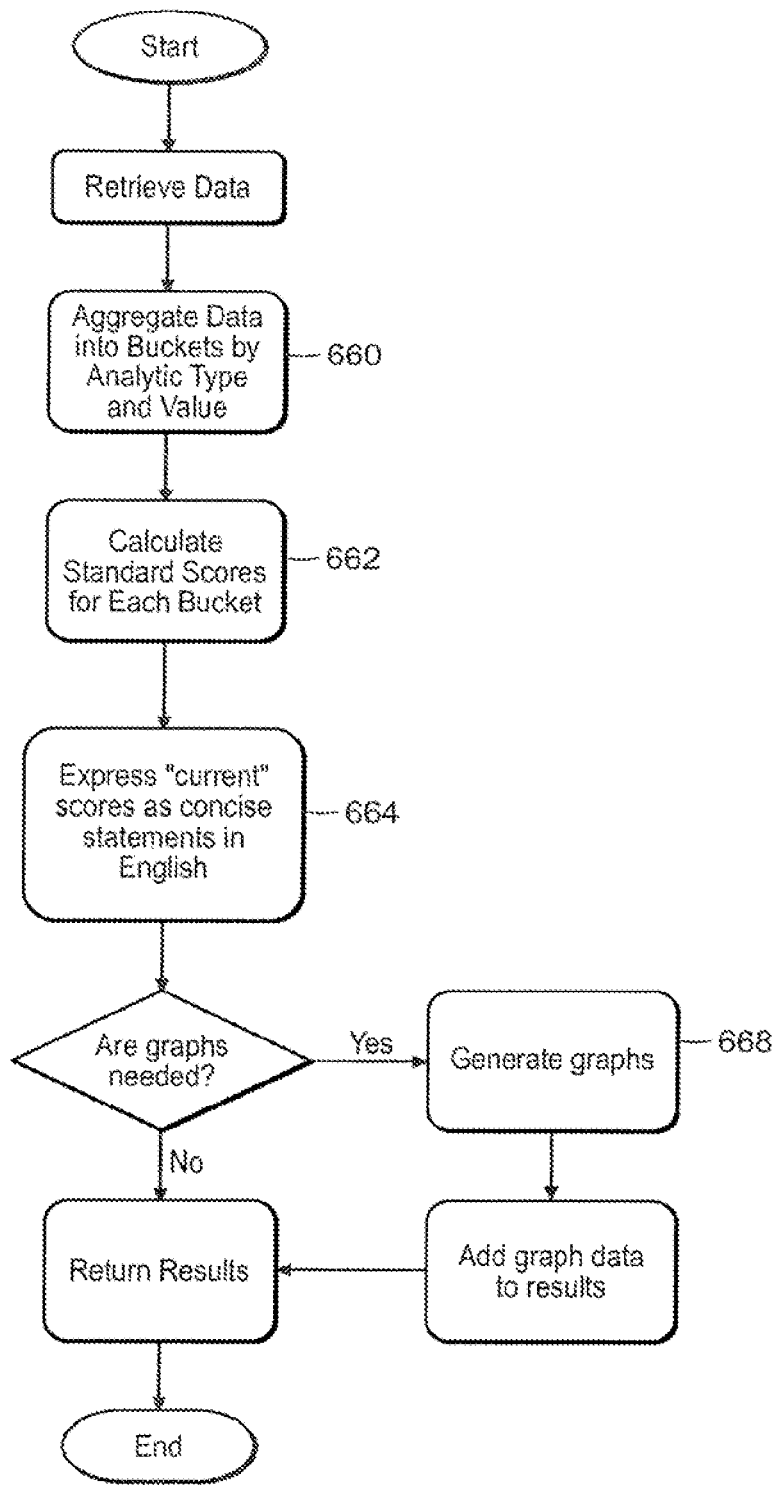

Referring to FIGS. 6(*b*) and 6(*c*), data for the team (messages 112, and whatever additional data are collected by the system) may be collected, and separated into bins for analysis:

Messages may be grouped by the emotion and/or sentiment. For example, if there are eight categories of emotions (seven emotions plus no_emotion) and three sentiments (positive, negative, and neutral), messages may be grouped into twenty-four categories, and messages may be grouped by histogramming message counts into those twenty-four categories. Histogramming may be referred to as a "z score," reflecting a z-axis value when the data are plotted against x and y axes. (step 660).

Messages may be grouped by time period, for example, daily, weekly, or in three-day windows. To continue from the previous, each time period may have twenty-four histogram buckets.

In each time interval, system 100 may collect a count of the total number of messages exchanged in the group.

Data may reflect some time interval, such as six months (for example, 60 three-day periods). The scores may be summed to the margins—for example, for a three-day period, the twenty-four cells may be summed into eight emotion margin cells, and three margin sentiment cells.

In step 662, as a further data normalization, system 100 may compute a mean over the entire time interval, and then normalize each margin cell to a standard deviation measure. For example, if the 60 cells have an average number of 20 messages per day showing "joy" emotion, with a standard deviation of 3 counts, then cells with 16, 20, and 22 counts would be normalized to "−1.33, 0, 0.67" for further processing. In computing the mean, the most-recent time interval may be excluded from the calculation of the mean, so that any deviation of the most-recent time interval will be more prominent as a deviation from a trend.

In some cases, the data may be first reduced to ratios (based on the total number of messages per day), before the mean and standard deviation normalization.

In some cases, the mean and standard deviation normalization may be linear. In others, an exponential decay function may be applied, so that older time intervals count less than more recent time intervals.

In step 664, the scores for the most recent interval may be normalized on the same scale, and the degree of departure from the mean may be translated in to a text expression of degree of change. For example:

A normalized score of the most-recent time interval that is within one standard deviation from the mean may be reported as "no change."

A normalized score for the most-recent time interval that is greater than three standard deviations may be reported as an anomalously large change.

A normalized score for the most-recent time interval that is more than one and less than three standard deviations may be reported using nuanced words of gradation to express a degree of change.

In some cases, it may be desirable to compute a linear fit to identify a general up-trend or down-trend for a sentiment or emotion.

In step 668, if the user requests, the data may be graphed, graphs such as those in FIGS. 2(*a*) to 2(*g*) and 3(*c*) may be generated.

Techniques used for measuring an individual's allostatic load may be extended to estimate expected collective allostatic load (CAL) on the team. From that, interventions may be developed to reduce deleterious effects. To effectively modulate the effects of CAL on existing teams, a first step is a credible quantification of collective allostatic load, its effects, and the effect of any such interventions, so that effective suggestions may be made for a given team. To modulate the effects of CAL in the future, we might also optimize team creation with respect to their capacity for operation under CAL. In both cases, a scalable, reliable, and unobtrusively collected measure of CAL may assist in developing reliable interventions.

A precise and quantitative description of and measurement of CAL (as manifest in data from unobtrusive and scalable data collection) is helpful to effectively optimize a team's CAL-resilience. To describe CAL in this data collection involves collecting a wide sample of data sources that both (a) have some known or suspected correlation with stress (individual or team) and (b) are scalably and reliably measured. The core challenge is estimation of a quantity that is both under-defined and not directly observable: CAL. A wide empirical modeling approach may be used to set up infrastructure to perform experimentation to assess the causal relationship between interventions and a team's CAL-resilience.

CAL may be operationalized as a quantity reflecting the amount of built up stress that a person or team is under. In this formulation, stress grows and decays through daily events, and CAL is the current level of undecayed stress. When a person is under stress this quantity increases, and as a person is able to process and unwind from that stress, it decreases. To support this operationalization of CAL, software may estimate (1) when a user is experiencing the deleterious effects of stress and (2) when the team experiences a stressful event that should affect their CAL.

CAL-resilience may be quantified by examining those teams that have high and repeated measures of stressful events, yet whose individuals appear to be largely free of the effects of prolonged stress. Similarly, CAL-susceptibility may be quantified by examining the teams that have few stressful events, yet whose individuals are exhibiting the deleterious effects of stress. By examining the relative proportion of team members under stress (and the relative stress levels of each team member) before and after a stressful team event expected to add to CAL, the effect of any stressful event on a team's CAL may be quantified.

CAL may be inferred as a latent or hidden variable inferred from measuring the induced impedance it causes between the measurable quantities-team stress and aggregated measures of the deleterious effects of stress on individuals. Various techniques for computing hidden state variables may be employed.

IV. USE CASES

A better understanding of CAL and CAL-resilience may improve capabilities for teams and organizations. Members of certain teams are exposed to disturbing or emotional information daily (e.g., emergency workers, or those forced to make high-stakes decisions quickly and with little information). Some are able to function at high levels of performance in these roles and missions for extended times, while others are adversely affected and burn out. A comprehensive analysis of personal and team factors may do a better job selecting those for these jobs who are more like the former than the latter, and may help enact interventions that will reduce the CAL or induce CAL-resilience in these teams.

Personal data from users obtained before team formation, and data collected from nascent teams may be used to predict viability and CAL-resilience prior to their exposure to allostatic load. Critically, this could be done with sufficient time to course-correct or dissolve and reconstitute teams priori to deleterious effects on either the enterprise or the individuals.

From this collection, a cohort may be selected comprised of groups with high and low estimated CAL-resilience (and matched on arbitrary variables like size and age of company). This will provide a smaller number of teams for more in depth analysis to determine the relevant contributing factors to CAL-resilience, effective interventions for lowering CAL, and other team dynamic measures.

V. COMPUTER IMPLEMENTATION

Various processes described herein may be implemented by appropriately programmed general-purpose computers, special-purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogenous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

VI. INCORPORATION BY REFERENCE

The following are incorporated by reference:
Clayton J Hutto and Eric Gilbert, VADER: A Parsimonious Rule-based Model for Sentiment Analysis of Social Media Text, Association for the Advancement of Artificial Intelligence, Proceedings of the Eighth International AAAI Conference on Weblogs and Social Media, Ann Arbor, Mich. (2014).

Glen Coppersmith, Mark Dredze, Craig Harman, Quantifying Mental Health Signals in Twitter, Associational for Computational Linguistics, Workshop of Computational Linguistics and Clinical Psychology (2014)

Glen Coppersmith, Craig Harman, Mark Dredze, Measuring Post Traumatic Stress Disorder in Twitter, Association for the Advancement of Artificial Intelligence. International AAAI Conference on Web and Social Media (January 2014)

Glen Coppersmith, Mark Dredze, Craig Harman, Kristy Hollingshead, From ADHD to SAD: Analyzing the Language of Mental Health on Twitter through Self-Reported Diagnoses. Association for Computational Linguistics, Proceedings of the 2nd Workshop on Computational Linguistics and Clinical Psychology: From Linguistic Signal to Clinical Reality, Denver, Colo., pages 1-10 (Jun. 5, 2015)

Glen Coppersmith, Mark Dredze, Craig Harman, Kristy Hollingshead, Margaret Mitchell, CLPsych 2015 Shared Task: Depression and PTSD on Twitter, Association for Computational Linguistics, Proceedings of the 2nd Workshop on Computational Linguistics and Clinical Psychology: From Linguistic Signal to Clinical Reality, Denver, Colo., pages 31-39 (Jun. 5, 2015)

Margaret Mitchell, Kristy Hollingshead, Glen Coppersmith, Quantifying the Language of Schizophrenia in Social Media, Association for Computational Linguistics, Proceedings of the 2nd Workshop on Computational Linguistics and Clinical Psychology: From Linguistic Signal to Clinical Reality, Denver, Colo., pages 11-20 (Jun. 5, 2015)

Glen Coppersmith, Ryan Leary, Eric Whyne, Tony Wood, Quantifying suicidal ideation via language usage on social media, American Statistical Ass'n et al., Joint Statistical Meetings, Joint Statistics Meetings Proceedings, Statistical Computing Section, Seattle Wash. (August 2015).

Mrinal Kumar, Mark Dredze, Glen Coppersmith, Munmun De Choudhury, Detecting Changes in Suicide Content Manifested in Social Media Following Celebrity Suicides, HT '15 Proceedings of the 26th ACM Conference on Hypertext & Social Media, Guzelyurt, Northern Cyprus, Pages 85-94 (Sep. 1-4, 2015)

Anthony Wood, Jessica Shiffman, Ryan Leary, Glen Coppersmith, Language Signals Preceding Suicide Attempts. Ass'n for Computing Machinery, CHI '16 Proceedings of the 2016 CHI Conference on Human Factors in Computing Systems, San Jose, Calif., pp. 2098-2110 (May 7-12, 2016)

Munmun De Choudhury, Emre Kiciman, Mark Dredze, Glen Coppersmith, Mrinal Kumar, Discovering Shifts to Suicidal Ideation from Mental Health Content in Social Media, Ass'n for Computing Machinery, CHI '16 Proceedings of the 2016 CHI Conference on Human Factors in Computing Systems, San Jose, Calif., pp. 2098-2110 (May 7-12, 2016)

Glen Coppersmith, Kim Ngo, Ryan Leary, Anthony Wood, Exploratory Analysis of Social Media Prior to a Suicide Attempt, Association for Computational Linguistics, Proceedings of the 3rd Workshop on Computational Linguistics and Clinical Psychology: From Linguistic Signal to Clinical Reality, San Diego, Calif., pages 106-117 (Jun. 16, 2016)

Glen Coppersmith, Kristy Hollingshead, H. Andrew Schwartz, Molly E. Ireland, Rebecca Resnik, Kate Loveys, April Foreman, Loring Ingraham, *The Clinical Panel: Leveraging Psychological Expertise During NLP Research*, Association for Computational Linguistics, Proceedings of 2016 EMNLP Workshop on Natural Language Processing and Computational Social Science, Austin, Tex., pages 132-137 (Nov. 5, 2016)

Danielle Mowery; Hilary Smith; Greg Stoddard, Glen Coppersmith; Craig Bryan. Mike Conway, *Understanding Depressive Symptoms and Psychosocial Stressors on Twitter: A Corpus-Based Study*, J Medical Internet Research, Vol. 19, No. 2 (Feb. 28, 2017)

Adrian Benton, Glen Coppersmith, Mark Dredze. Ethical Research Protocols for Social Media Health Research, Association for Computational Linguistics. Proceedings of the First ACL Workshop on Ethics in Natural Language Processing, Valencia. Spain, pp. 94-102 (Apr. 4, 2017)

Glen Coppersmith; Casey Hilland; Ophir Frieder; Ryan Leary, *Scalable mental health analysis in the clinical whitespace via natural language processing*, 2017 IEEE EMBS International Conference on Biomedical & Health Informatics (BHI), Orlando, Fla., IEEE (Apr. 13, 2017)

Thomas Hellwig, Caroline Rook, Elizabeth Florent-Treacy, Manfred F. R. Kets do Vries, *An Early Warning System for Your Team's Stress Level*, Harvard Business Review (Apr. 26, 2017), https://hbr.org/2017/04/an-early-warning-system-for-your-teams-stress-level Glen Coppersmith, Patrick Crutchley, Raina M Merchant, H Andrew Schwartz, Validation of Twitter Self-Stated Models of Mental Health against Patient Medical Records Kate Loveys, Patrick Crutchley, Emily Wyatt, Glen Coppersmith, Small but Mighty: Affective Micropatterns for Quantifying Mental Health from Social Media Language Kate G. Niederhoffer, Jonathan Schler, Patrick Crutchley, Kate Loveys. Glen Coppersmith, In your wildest dreams: the language and psychological features of dreams

VII. CONCLUSION

For the convenience of the trader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A method, comprising the steps of:
   by computer, evaluating free-form text messages among team members of a team, using natural language processing techniques to process the text messages and to assess psychological state of the team members as reflected in the text messages;
   by the computer, assembling the psychological state of the team members as reflected in the text messages to evaluate team collective psychological state;
   in a memory of the computer, grouping the text messages into predetermined psychological state categories by determined emotion and/or sentiment of each of the text messages, the predetermined psychological state categories comprise more than one category of emotion and more than one category of sentiment;
   histogramming message counts in each of the predetermined psychological state categories;
   in the memory of the computer, histogramming psychological state assessment counts of the team members by time interval; and
   by the computer, reporting a trend of the team collective psychological state in natural language text form.

2. The method of claim 1, wherein the histogramming psychological state assessment counts of the team members includes histogramming psychological state assessment counts of the team members by the time interval and a psychological assessment value.

3. The method of claim 2, further comprising, in the memory of the computer, the step of:
   computing a trend of the team collective psychological state by the time interval.

4. The method of claim 1, wherein the using the natural language processing techniques to process the text messages includes using the natural language processing techniques to process the text messages and to assess at least three emotions of the team members as reflected in the text messages, the three emotions drawn from the group consisting of anger, disgust, fear, happiness, sadness, love, surprise, trust, distrust, surprise, or anticipation.

5. The method of claim 4, wherein the using the natural language processing techniques to process the text messages includes using the natural language processing techniques to process the text messages and to assess sentiment of the team members as reflected in the text messages, the sentiment lying on a spectrum from positive to neutral to negative.

6. The method of claim 4, further comprising the step of:
   monitoring one or more environmental factors in a work area of the team, at least one of the monitored environmental factors being drawn from a group consisting of temperature, humidity, sound level, or sound character.

7. The method of claim 1, further comprising, in the memory of the computer, the step of:
   grouping the text messages according to predetermined time periods.

8. The method of claim 7, further comprising, in the memory of the computer, the step of:
   computing a mean over a time interval including a plurality of the predetermined time periods.

9. The method of claim 8, wherein a most recent time period of the time interval is excluded from the computing of the mean.

10. The method of claim 8, further comprising, in the memory of the computer, the step of:
    reducing the message counts in each of the predetermined psychological state categories ratios based upon a total number of the text messages per day before the computing of the mean.

11. The method of claim 8, further comprising, in the memory of the computer, the step of:
    grouping further text messages according to a further predetermined time period;

comparing message count data of the further text messages to the mean of the time interval; and creating a text expression of any degree of change between the further text messages as compared to the mean of the time interval.

12. The method of claim 11, wherein:

a first score of the further time period that is within one standard deviation from the mean is reported as no change in the psychological state of the team members:

a second score of the further time period that is greater than three standard deviations from the mean is reported as an anomalously great increase in the psychological state of the team members; and a third score of the further time period that is more than one and less than three standard deviations from the mean is reported using text to express a minor degree of change.

13. The method of claim 8, further comprising, in the memory of the computer, the step of:

graphing the message counts in each of the predetermined psychological state categories for the reporting of the trend, wherein the graphing illustrates a number of text messages among the team members, and an average level for several emotions of the team.

14. A method, by computer, comprising the steps of:

evaluating free-form text messages among team members of a team using natural language processing techniques to process the text messages and to assess psychological states of the team members as reflected in the text messages;

grouping the text messages into predetermined psychological state categories by determined emotion and/or sentiment in each of the text messages, wherein the predetermined psychological state categories comprise more than one category of emotion and more than one category of sentiment;

grouping the text messages according to predetermined time periods;

computing a first mean for each of the predetermined psychological state categories over a time interval including a plurality of the predetermined time periods;

grouping further text messages into the predetermined psychological state categories for a further time period;

comparing the further time period to the first mean to determine a standard deviation for each of the predetermined psychological state categories of the further text messages;

determining a team collective psychological state from the standard deviation for each of the predetermined psychological state categories of the further text messages; and reporting the team collective psychological state in natural language text form.

15. The method of claim 14, further comprising histogramming message counts in each of the predetermined psychological state categories.

16. An apparatus, comprising:

a computer processor;

a nontransitory memory, the memory having stored therein one or more programs to cause the processor to:

evaluate free-form text messages among team members of a team, using natural language processing techniques to process the text messages and to assess psychological state of the team members as reflected in the text messages;

assemble the psychological state as reflected in the text messages to evaluate team collective psychological state;

group the text messages into predetermined psychological state categories by determined emotion and/or sentiment of each of the text messages, the predetermined psychological state categories comprise more than one category of emotion and more than one category of sentiment;

histogram message counts in each of the predetermined psychological state categories;

histogram psychological state assessment counts by time interval and psychological assessment value; and report a trend of the team collective psychological state in natural language text form.

17. The apparatus of claim 16, the one or more programs being further programmed to cause the processor to:

use natural language processing techniques to process the text messages and to assess at least three emotions of the team members as reflected in the text messages, the three emotions drawn from the group consisting of anger, disgust, fear, happiness, sadness, love, surprise, trust, distrust, surprise, or anticipation;

use natural language processing techniques to process the text messages and to assess sentiment of the team members as reflected in the text messages, sentiment lying on a spectrum from positive to neutral to negative; and/or monitor one or more environmental factors in a work area of the team, at least one of the monitored environmental factors being drawn from a group consisting of temperature, humidity, sound level, or sound character.

18. The apparatus of claim 16, the one or more programs being further programmed to cause the processor to:

compute the trend of the team collective psychological state and the psychological state assessment counts by time interval.

* * * * *